US012123186B2

(12) United States Patent
Slater et al.

(10) Patent No.: US 12,123,186 B2
(45) Date of Patent: Oct. 22, 2024

(54) SYSTEMS AND METHODS FOR SUPPORTING SUSPENDED ITEMS

(71) Applicant: Xylem Vue Inc., New York, NY (US)

(72) Inventors: Jeremy Slater, Walkerton, IN (US); Ruben Kertesz, South Bend, IN (US)

(73) Assignee: Xylem Vue Inc., New York, NY (US)

( * ) Notice: Subject to any disclaimer, the term of this patent is extended or adjusted under 35 U.S.C. 154(b) by 158 days.

(21) Appl. No.: 17/279,597

(22) PCT Filed: Oct. 4, 2020

(86) PCT No.: PCT/US2020/054191
§ 371 (c)(1),
(2) Date: Mar. 25, 2021

(87) PCT Pub. No.: WO2021/067904
PCT Pub. Date: Apr. 8, 2021

(65) Prior Publication Data
US 2022/0307253 A1  Sep. 29, 2022

Related U.S. Application Data

(60) Provisional application No. 62/910,477, filed on Oct. 4, 2019.

(51) Int. Cl.
*E03F 5/02* (2006.01)
*E02D 29/12* (2006.01)
(52) U.S. Cl.
CPC ............... *E03F 5/02* (2013.01); *E02D 29/12* (2013.01)
(58) Field of Classification Search
None
See application file for complete search history.

(56) References Cited

U.S. PATENT DOCUMENTS

| 5,240,032 A | * | 8/1993 | Mizioch | F16L 3/1207 |
| | | | | 137/368 |
| 10,081,926 B2 | * | 9/2018 | Wood | E02D 17/086 |

FOREIGN PATENT DOCUMENTS

| JP | 58-180938 U | 12/1983 |
| JP | 06-087433 U | 12/1994 |
| JP | 2018-012544 A | 1/2018 |

OTHER PUBLICATIONS

First Examination Report of Indian Patent Application No. 202117015529 mailed on May 11, 2022, 6 Pages.

(Continued)

*Primary Examiner* — Steven M Marsh
(74) *Attorney, Agent, or Firm* — Stanek Lemon Crouse & Meeks, PA

(57) ABSTRACT

Supporting assemblies for supporting a suspended load and processes relating thereto are described. An exemplar supporting assembly includes: (i) an area-narrowing feature including a first inner surface defining a first aperture; (ii) a main tube including an interior-main surface defining a cavity having disposed therewithin the area-narrowing feature; (iii) an area-expanding feature including a second outer surface; and (iv) a telescoping rod including an outer-telescoping surface having disposed thereon the area-expanding feature. In an assembled state of the supporting assembly, the outer-telescoping surface slidably passes through and establishes a first frictional contact with the first inner surface, and the second outer surface slidably engages and establishes a second frictional contact with the interior-main surface. In this configuration, the area-narrowing feature and the area-expanding feature facilitate slidable engagement of the telescoping rod to expand out of or retract inside, without decoupling from, the main tube.

14 Claims, 19 Drawing Sheets

(56) References Cited

OTHER PUBLICATIONS

International Search Report and Written Opinion of International Application No. PCT/US2020/054191 mailed on Jan. 20, 2021, 12 pages.

\* cited by examiner

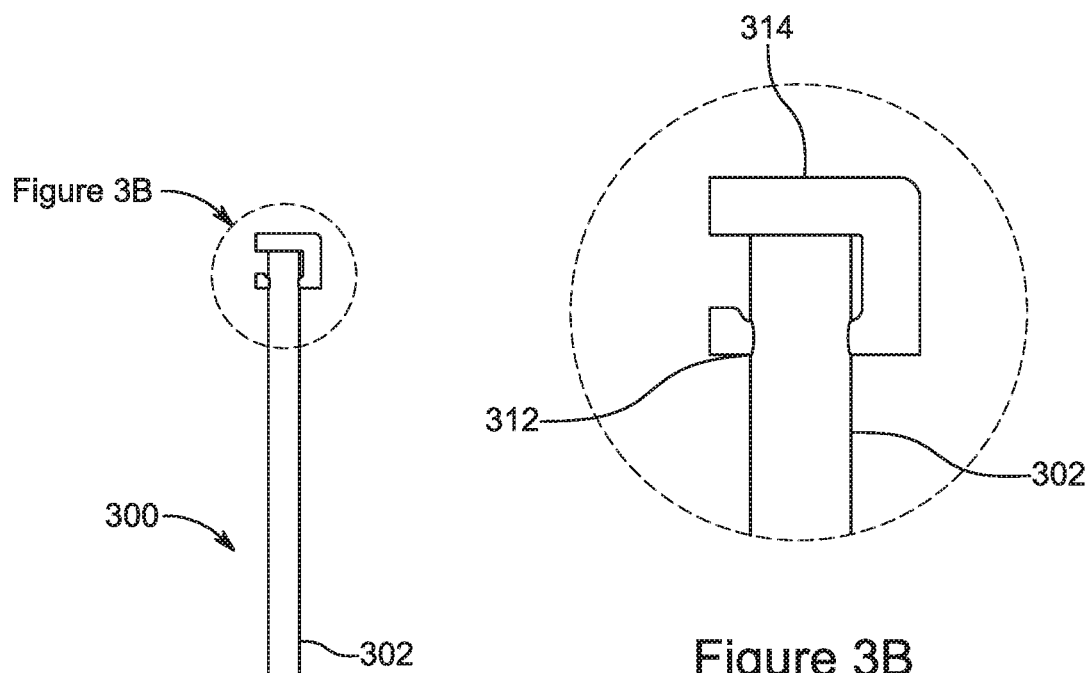
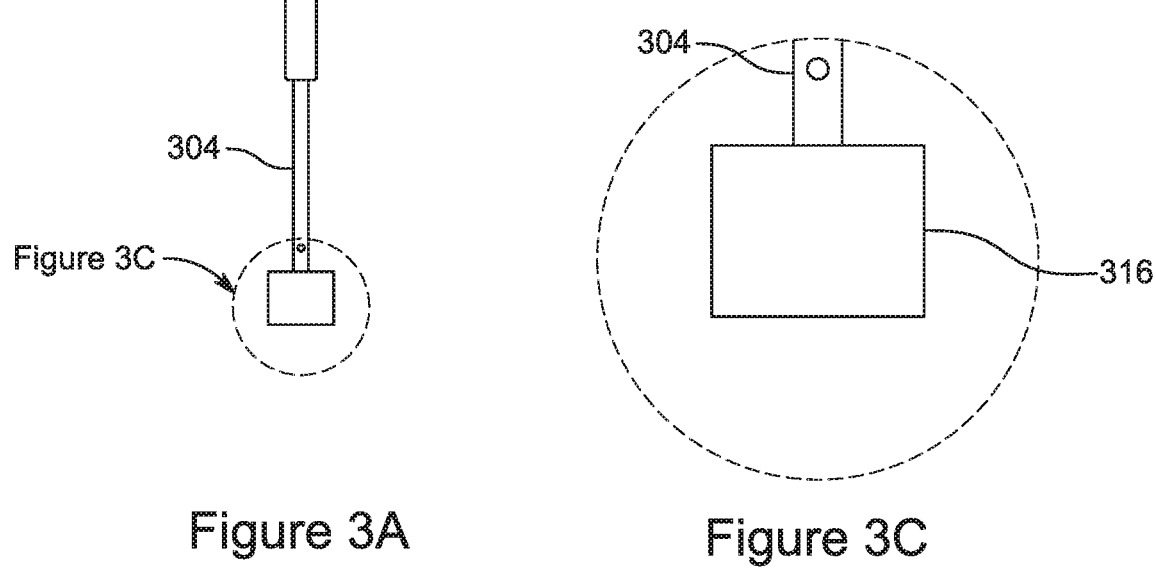
Figure 3A  Figure 3B  Figure 3C

SYSTEMS AND METHODS FOR SUPPORTING SUSPENDED ITEMS

RELATED APPLICATION

This application claims the benefit from International Application No. PCT/US2020/054191, which was granted an International filing date of Oct. 4, 2020, which in turns claims priority from U.S. provisional application No. 62/910,477 filed on Oct. 4, 2019, which is incorporated herein by reference for all purposes.

FIELD

The present arrangements and teachings generally relate to supporting assemblies and methods allowing suspension of items over an opening. More particularly, the present teachings and methods relate to supporting assemblies that effectively allow suspension of items, e.g., enclosures and equipment, over a relatively deep opening, such as a manhole environment.

BACKGROUND

A sewer system collects, transports, treats and/or dispenses fluid. At various locations, a manhole is provided to access the sewer system primarily for monitoring and/or maintenance of the sewer system. Examples of such monitoring and/or maintenance equipment includes sensors (e.g., radar and/or an imaging device), batteries and telemetry. There are instances (e.g., during monitoring and measurement, when information regarding water level inside the sewer system is obtained) that require precise placement of such equipment inside the manhole. Unfortunately, current systems and methods used for placement of such equipment suffer from drawbacks. By way of example, the current placement apparatus does not allow for precise positioning of the equipment during monitoring and/or measurement. As another example, the current placement apparatus designs and its related methods are not a reliable one as it risks losing components and/or monitoring and/or maintenance equipment that it is designed to secure.

What are, therefore, needed are novel systems and methods that are employed for effectively supporting suspended items, such as equipment for monitoring and/or maintaining fluid levels inside a fluid conveyance, without suffering from the drawbacks of unreliable assembly and imprecise positioning that are encountered when using current systems and methods used for placement of such items.

SUMMARY

To achieve the foregoing, the present teachings provide novel systems and methods for effective management of water collection and conveyance systems. The present systems and methods rely on novel present arrangements of components used in water collection and conveyance systems, to monitor and control transport, storage and treatment of fluid streams. Examples of such components include main tube, telescoping rod, area-narrowing feature, area-expanding feature and brackets.

Subassemblies that include such components as a main tube, a telescoping rod, an area-narrowing feature and an area-expanding feature produce strong and reliable present arrangements that are capable of being rapidly assembled and disassembled, without risking the loss of these components or the monitoring and maintenance equipment (that it is designed to support). Further, the present arrangements ensure that these subassemblies are precisely positioned inside the opening by relying upon brackets, which are firmly secured at opposing sides of a sidewall inside an opening (e.g., manhole). Each time subassemblies are connected to the secured brackets for measurement and/or monitoring, they acquire a desirable, predefined location and orientation inside the opening to obtain meaningful data that accurately informs on the conditions inside the opening.

In one aspect, the present arrangements offer novel supporting assemblies for supporting a suspended load. An exemplar of such supporting assemblies includes a main tube including an interior-main surface that extends from a first end to a second end. The interior main surface defines a cavity having disposed therewithin, at the first end, an area-narrowing feature. This feature includes a first inner surface that defines a first aperture spanning a first cross-sectional area.

The exemplar supporting assemblies also include a telescoping rod having an outer-telescoping surface that extends from a connecting end to a terminating end. The telescoping rod has disposed thereon, at the connecting end, an area-expanding feature. This feature includes a second outer surface.

In an assembled state of the supporting assembly, the outer-telescoping surface slidably passes through and establishes a first frictional contact with the first inner surface of the area-narrowing feature. In this configuration, the second outer surface is free to slidably engage and establish a second frictional contact with the interior-main surface.

Further, the area-narrowing feature and the area-expanding feature of the present arrangements facilitate slidable engagement of the telescoping rod to expand out of or retract inside, without decoupling from, the main tube. In other words, present supporting subassemblies, among other advantages, prevent loss of monitoring and/or measuring equipment and components, such as a telescoping rod, during their installation and/or removal inside a manhole, resulting from decoupling from the main tube. To this end, when a substantial portion of the outer-telescoping surface slidably passes through the first inner surface, the area-narrowing feature abuts the area-expanding feature further assisting in the prevention of decoupling of the telescoping rod from the main tube.

This is further still aided by the fact that, in the assembled state of the present supporting assemblies, displacement of the telescoping rod is largely in an x-direction. Moreover, there is little to no displacement of the telescoping rod in a y-direction and/or in z-direction. By way of example, displacement of the telescoping rod in a y-direction and/or in z-direction is less than about 3° from an x-z plane and/or from an x-y plane, respectively. The x-z plane is a plane that extends in the x-direction and the z-direction and the x-y plane extends in the x-direction and the y-direction. In some instances when a significant portion of the telescoping rod is in a retracted position inside the main tube, the y-direction and/or z-direction displacement of the telescoping rod is less than about 1° from the x-z plane and/or the x-y plane. Such confined displacement of the telescoping rod in the y-direction and the z-direction makes for easier handling of the present supporting assemblies and prevents loss of the telescoping rod during installation and/or disassembly of the supporting assembly.

The magnitude of different dimensions involved in the present supporting assemblies depend on various factors, such as materials (e.g., metal or plastic) used to produce certain components or a linear distance spanned by the main tube and the telescoping rod in their assembled state. By way of example, the first inner diameter ranges from about 10 mm to about 30 mm and the second outer surface spans a second outer diameter ranging from about 14.8 mm to about 34.8 mm.

In certain preferred embodiments of the present supporting assemblies, the telescoping rod includes the area-expanding feature as a single unitary structure. In these and/or other embodiments, the main tube includes the area-narrowing feature and also represents a single unitary structure of a different type. The present arrangements described herein, however, are not so limited.

In other preferred embodiments of the present supporting assemblies, the area-narrowing feature is provided in a discrete component, i.e., first annular component, and the area-expanding feature is provided in another discrete component, i.e., second annular component.

Each of the main tube and the telescoping rod has one shape chosen from a group comprising circular, rectangular, square and triangular. Preferably, however, each of the cavity, the outer-telescoping surface and the first aperture is circular shaped. Further, in these preferred embodiments, the area-narrowing feature is a diameter-narrowing feature, the area-expanding feature is a diameter-expanding feature, and the first aperture spans a first inner diameter.

The first annular component includes the first inner surface and a first outer surface. In the assembled state of the supporting assembly, the first outer surface contacts inner sidewalls of the cavity to form a main tube subassembly. In this configuration, the first annular component is press-fitted within the cavity of the main tube to produce a main tube subassembly having an effective diameter that is equal to the first inner diameter. By way of example, the first outer surface is substantially circular-shaped and spans a first outer diameter ranging from about 14.999 mm to about 34.999 mm. In this example, the cavity spans a main interior diameter ranging from about 15 mm and about 35 mm. In those instances where the main tube and the first annular component are not circularly shaped, the main tube subassembly has an effective cross-sectional area that is equal to the first inner cross-sectional area of the first aperture.

A telescoping rod subassembly, similarly, includes a telescoping rod and a second annular element. The second annular component includes the second outer surface, which is preferably circularly shaped and spans a second outer diameter and a second inner surface. Further, the second inner surface defines a second aperture that spans a second inner diameter. In this subassembly, the telescoping rod further comprises a relatively-larger-outer-diameter rod portion extending into the terminating end and a relatively smaller-outer-diameter rod portion extending into the connecting end. Further, a diameter of the relatively-smaller-outer-diameter rod portion is smaller than the second inner diameter, such that in the assembled state of the supporting assembly, the second inner surface, at or near the connecting end, contacts outer surface of the relatively-smaller-outer-diameter rod portion. In this configuration, the telescoping rod is fixedly secured inside the second annular component to form a telescoping rod subassembly having an effective diameter that is equal to the second outer diameter. In those instances where the telescoping rod and the second annular component are not circularly shaped, the telescoping rod subassembly has an effective cross-sectional area that is equal to the second outer cross-sectional area of the second aperture.

By way of example, the second inner diameter ranges from about 10 mm to about 30 mm, and the diameter of the relatively-smaller-outer-diameter rod portion ranges from about 9.999 mm to about 29.999 mm. As another example, the diameter of the relatively-larger-outer-diameter rod portion is smaller than the first inner diameter and ranges from about 9.8 mm to about 29.8 mm.

In certain preferred arrangements of the present supporting assemblies, the main tube and the telescoping rod combine to span a distance ranging from about 2 feet to about 4 feet, and the first inner diameter is about 19 mm, the first outer diameter is about 24.999 mm, the second inner diameter is about 12 mm, the second outer diameter is about 24.85 mm, the diameter of the relatively smaller-outer-diameter rod portion is about 11.99 mm, the diameter of the relatively larger-outer-diameter rod portion is about 18.8 mm, and the interior main diameter is about 25 mm.

Regardless of whether single unitary structures or discrete components assembled to form subassemblies are used to form the present supporting assemblies, the dimensions provided for first inner diameter and the second outer diameter apply equally to achieve narrowing or expanding of the tube or rod diameters, respectively. Specifically, the diameter-narrowing feature effectively narrows the diameter of the main tube's cavity to a relatively smaller first inner diameter and the diameter-expanding feature effectively expands the diameter of the telescoping rod to a relatively larger second outer diameter. The interplay of these two different effective diameters strongly couples the main tube and telescoping rod, ensuring that they will not undesirably decouple during installation, removal or operating conditions of the present supporting assemblies.

To allow for installation of the assembly of main tube and telescoping rod inside an opening (e.g., manhole), the present arrangements preferably use brackets. By way of example, the main tube, at or near a second end, has defined therein a main-tube-connecting aperture and the supporting assembly further includes a first bracket including a hook portion and a wall portion. In an installed state of the supporting assembly, the hook portion engages with the main-tube-connecting aperture to couple the main tube and the first bracket. Further, the wall portion has defined therein one or more apertures designed to attach the first bracket to one end of a sidewall of an opening defined within a surface.

In connection with the installation of the telescoping rod, at or near a terminating end, the telescoping rod includes an engaging portion, and the supporting assembly further includes a second bracket including a securing portion and a supporting portion. In an installed configuration of the supporting assembly, the engaging portion engages with the securing portion to couple the telescoping rod to the second bracket and the supporting portion has defined therein one or more apertures designed to attach the second bracket to an opposite side of the sidewall of the opening defined within the surface.

In certain embodiments of the telescoping rod of the present arrangements, the securing portion includes a ridge that secures an engaging portion, which includes any one member chosen from a group comprising circular slot, spherical bulb and hourglass. The circular slot may be linearly disposed on the telescoping rod and may have defined therein a channel-shaped opening that engages with the ridge to couple the telescoping rod and the second bracket. The spherical bulb may have a diameter larger than a ridge dimension of the ridge, and having a pinched region proximate to the spherical bulb such that in a coupled position of the telescoping rod with the second bracket, the pinched region of the telescoping rod engages with the ridge of the second bracket and the spherical bulb abuts the ridge, preventing decoupling of the telescoping rod with the second bracket.

In preferred embodiments of the present arrangements, the telescoping rod, at or near the terminating end, has defined therein a telescoping-rod-connecting aperture. In an installed state of the supporting assembly, a fastening member engages with the telescoping-rod-connecting aperture to serve as an additional preventive measure against decoupling of the telescoping rod from the main tube.

In the installed state of the supporting assembly, the second bracket has disposed thereon, a locking mechanism to hold in place the engaging portion as it engages with the securing portion and to prevent the telescoping rod from decoupling from the second bracket. In one embodiment, the locking mechanism includes a clamp or a pin. If a pin is used, it may pass through an aperture that is defined within the securing portion of the second bracket and perpendicular to a direction in which the engaging portion engages with the securing portion.

The suspended load may be a radar and/or camera, preferably, secured on the main tube. The radar is designed to measure water level inside a manhole and the camera is designed to image water level or contents inside manhole.

In another aspect, the present teachings provide methods for installing supporting assemblies. In certain preferred embodiments, the methods include obtaining a main tube and obtaining a telescoping rod. The step of obtaining a main tube comprises obtaining a main tube including an interior-main surface that extends from a first end to a second end. The interior-main surface defines a cavity having disposed therewithin an area-narrowing feature.

The step of obtaining a telescoping rod comprises obtaining a telescoping rod having an outer-telescoping surface that extends from a connecting end to a terminating end. Further, the outer-telescoping surface has disposed thereon, at the connecting end, an area-expanding feature, which includes a second outer surface.

After obtaining the main tube and telescoping rod, the present methods for installing, preferably, proceed to passing the telescoping rod through the cavity, at the second end, and the first aperture such that at least a portion of the telescoping rod comes out of the main tube. In this configuration, the outer-telescoping surface slidably passes through and establishes a first frictional contact with the first inner surface of the area-narrowing feature. Further, the second outer surface slidably engages and establishes a second frictional contact with the interior-main surface of the main tube. As a result of these steps, the area-narrowing feature and the area-expanding feature enable slidable engagement of the telescoping rod to expand out of or retract inside, and without decoupling from, the main tube.

The next two steps of coupling and engaging the main tube and telescoping rod subassembly to the brackets may be done in any order. The present methods of installing include a step of coupling a hook portion of a first bracket with a main-tube-connecting aperture defined at, or proximate to, the second end of the main tube to couple the main tube to the first bracket. The present methods of installing also include a step of engaging an engaging portion, disposed at or near a terminating end, of the telescoping rod to a securing portion of the second bracket to couple the telescoping rod to the second bracket, wherein the connecting end is opposite to the terminating end.

According to certain preferred embodiment of the present teachings, the methods of installing further include introducing a fastener through an aperture defined in, at or near the terminating end of the telescoping rod to prevent the telescoping rod from decoupling from the main tube.

In certain embodiments of the present teachings, the step of securing a wall portion of the first bracket to one side of sidewall is carried out prior to the step of coupling (the hook portion with the main-tube-connecting aperture) and the step of securing a supporting portion of the second bracket to an opposite side of the sidewall is carried out prior to the step of engaging (the engaging portion with the securing portion).

Each of the steps of obtaining the main tube and the telescoping rod may include obtaining a single extruded unitary component. In this design, the main tube and telescoping rod may be made from a plastic material. Further, the single unitary main tube component has disposed thereon the area-narrowing feature and the single unitary telescoping rod component has disposed thereon the area-expanding feature. In alternate embodiments, however, discrete components, and not such single unitary components, are used. In these embodiments, the step of obtaining the main tube may include obtaining a main tube subassembly, in which one component, the main tube, has attached thereto another discrete component, i.e., the first annular component that provides the area-narrowing feature. Preferably, the step of obtaining the main tube includes press fitting the first annular component inside the cavity of the main tube.

In other alternate embodiments, similarly, the step of obtaining the telescoping rod includes obtaining a telescoping rod subassembly, in which the telescoping rod has attached thereon a second annular component that provides the area-expanding feature. Although not necessary, the step of obtaining the telescoping rod, preferably, includes using a locking nut that couples the second annular component to the telescoping rod. In this embodiment, at least a portion of the telescoping rod is threaded and is received at one end of the locking nut. The other end of the locking nut receives that second annular component to couple the telescoping rod and the second annular component. Regardless of the different steps used, once the present supporting assembly is installed inside an opening, the present methods include installing a radar and/or an imaging device to the main tube.

The system and method of operation of the present teachings and arrangements, however, together with additional objects and advantages thereof, will be best understood from the following descriptions of specific embodiments when read in connection with the accompanying figures.

BRIEF DESCRIPTION OF THE DRAWINGS

FIG. 3A shows a top view of a supporting assembly, according to certain embodiments of the present arrangements, including brackets, one of which (i.e., a first bracket) is coupled to the main tube and the other of which (i.e., a second bracket) is coupled to the telescoping rod.

FIG. 3B shows a top view of the first bracket, according to one embodiment of the present arrangements, being coupled to the main tube.

FIG. 3C shows a top view of the second bracket, according to one embodiment of the present arrangements, being coupled to the telescoping rod.

DETAILED DESCRIPTION OF THE DRAWINGS

Figure 1:
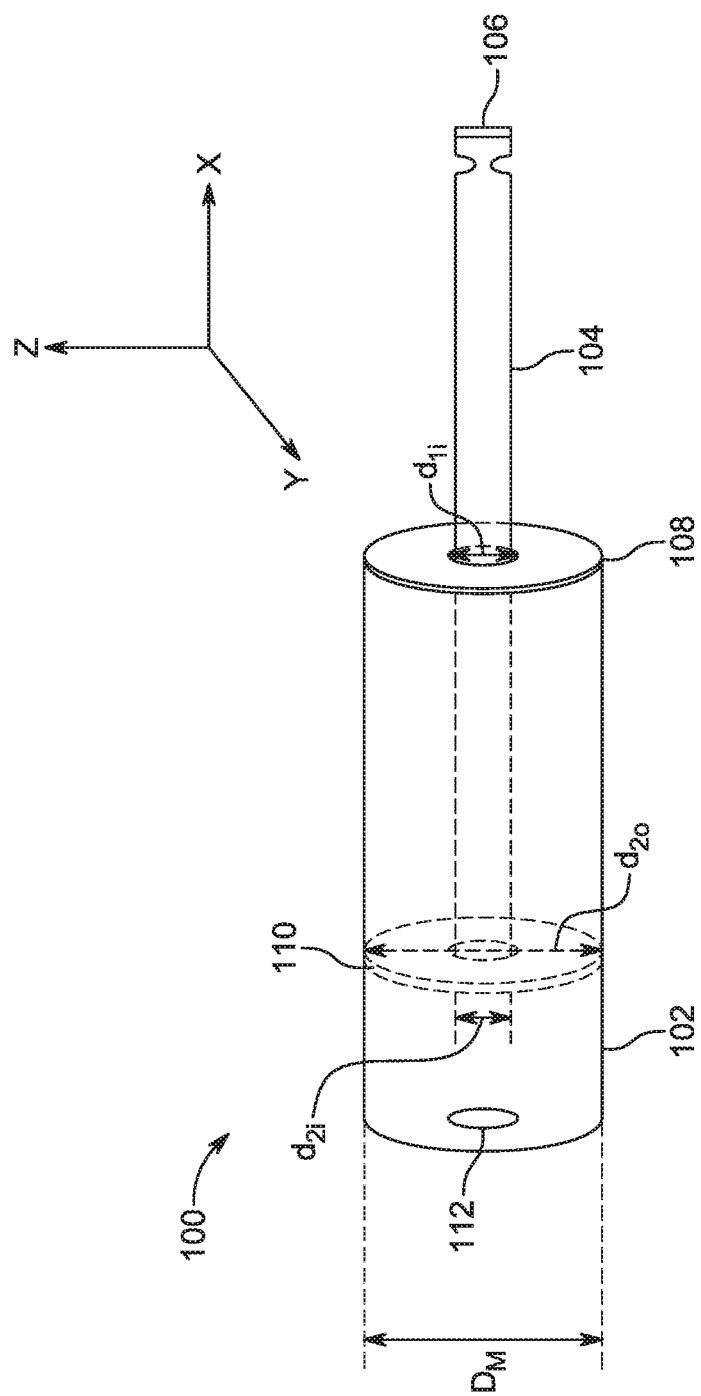
FIG. 1 shows a side view of a supporting subassembly, according to one embodiment of the present arrangements, including a telescoping rod in a retracted state inside a main tube.

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

The present arrangements offer supporting assemblies designed to suspend one or more enclosures and/or pieces of equipment, such as a radar or an imaging device, inside an opening, e.g., a manhole environment. In this example, these pieces of equipment, secured near the rim of the manhole, monitor and/or measure certain properties (e.g., water level) inside the manhole environment, obviating the need for a person to physically enter a manhole and install the necessary equipment.

The unique arrangement of the present support assemblies allows for rapid disassembly, removal and reinstallation of one or more enclosures and/or pieces of equipment. As a result, the present arrangements and also prevent such enclosures and/or equipment from blocking a path of rapid access to the manhole in the event such access becomes imperative.

Continuing with the manhole environment example, upon reinstallation of the present supporting assemblies, the enclosure's or equipment's height, with respect to a manhole chimney and rim, is not altered. Thus, the present support assemblies provide an enclosure and/or an equipment at a desired, predefined location to ensure repeatedly obtaining meaningful data of the water level inside a manhole.

The present teachings recognize that fluid level monitoring requires deploying such equipment as sensors, batteries, and telemetry in a sewer manhole. Currently, there are a number of systems or methods that accomplish this in different ways. One current, commonly used, system or method includes drilling hooks or mounting plates into a sidewall inside the manhole to secure the fluid monitoring equipment. Another system or method includes first installing, e.g., by press fitting, tension bars (also known as cargo bars) against the sidewalls inside the manhole, and then attaching, using one or more mounts or chains, the fluid monitoring equipment to the tension bar. A yet another system or method includes installing a bracket with two or more arms that articulate between a manhole rim and a manhole lid, and the articulating arms secure the fluid level measuring and/or monitoring equipment. According to the present teachings, the current systems or methods are not reliable as they prevent precise positioning of the monitoring equipment inside the manhole and/or the structural provision(s) (e.g., the articulating arms between the manhole rim and the manhole lid).

The support subassemblies of the present arrangements include, among other things, two tubes, or one tube and one rod, that may be extruded objects of different dimensions, i.e., a main tube and a telescoping rod. In one arrangement of the present support subassembly, a hollow main tube (e.g., main tube 102 of FIG. 1) having defined therein a cavity has a larger cross-sectional area than a telescoping rod (e.g., telescoping rod 104 of FIG. 1). Although, to facilitate discussion, the main tube, the telescoping rod, the area-narrowing feature and the area-expanding feature are described to have circular cross-sectional areas, the present teachings are not so limited. The cross-sectional areas of the main tube, telescoping rod, the area-narrowing feature and the area-expanding feature may be of other shapes, such as triangular, rectangular and square. Further, the telescoping rod may be a single solid piece or hollow like the main tube).

Regardless of the shape of the cross-sectional area involved and regardless of whether the telescoping rod is solid or hollow, the main tube extends from a first end to a second end, telescoping rod extends from a connecting end to a terminating end.

In some preferred embodiments of the present arrangements, the two extruded tubes, or an extruded tube and a rod, preferably, made from plastic and of different dimensions have disposed thereon certain features. Specifically, one extruded tube includes a main tube portion having disposed thereon, at the first end, an area-narrowing feature and another extruded tube or rod includes a telescoping rod portion having disposed thereon, at the connecting end, an area-expanding feature.

In other preferred embodiments of the present arrangements, the area-narrowing feature and the area-expanding feature are provided by discrete elements that couple to the main tube and the telescoping rod, respectively. In these embodiments, each of the main tube and the telescoping rod are fitted with their respective annular components (e.g., the main tube has fitted therewithin, at the first end, a first annular component and the telescoping rod has fitted thereon, at the connecting end, a second annular component). The coupling of the main tube and the first annular component results in the "main tube subassembly" and the coupling of the telescoping rod and the second annular component results in the "telescoping rod subassembly."

In another embodiment of the present arrangements, instead of having fitted thereon a first annular component, the main tube includes a crimp defining an annular diameter that is similar to that provided by the first annular component. In other words, a discrete first annular component is missing from this embodiment.

Regardless of whether the extruded main tube includes the area-narrowing feature as a unitary structure or, in the alternate, a discrete component in the main tube subassembly provides the area-narrowing feature, the area-narrowing feature serves to narrow the cross-sectional of the main tube. To this end, the area-narrowing feature includes a first inner surface that defines a first aperture spanning a first inner cross-sectional area. The cross-sectional area of the cavity of the main tube is larger than the first inner cross-sectional area. As a result, disposing the area-narrowing feature on the main tube reduces the effective cross-sectional area of the main tube.

Similarly, regardless of whether the extruded telescoping rod includes the area-expanding feature as a unitary structure or, in the alternate, a discrete second annular component in the main tube subassembly provides the area-expanding feature, the area-expanding feature serves to expand the cross-sectional of the telescoping rod. To this end, the area-expanding includes a second outer telescoping surface, and the cross-sectional area of the outer telescoping surface of the telescoping rod is smaller than that of the second outer surface. As a result, disposing the area-expanding feature on the telescoping rod expands the effective cross-sectional area of the telescoping rod.

The unitary structure of telescoping rod and the area-expanding feature or the telescoping rod subassembly passes through an opening of the cavity, at the second end, of the main tube and also passes through a first aperture. In this configuration, at least a portion of the unitary structure of telescoping rod and the area-expanding feature or the telescoping rod subassembly comes out of the unitary structure of the main tube with the area-narrowing feature or the main tube subassembly, respectively. This arrangement of the present supporting assemblies enables the main tube and the telescoping rod to articulate with respect to each other. Further, the area-narrowing feature and area-expanding feature create an isolated frictional point of contact that is isolated with respect to an outer surface of the telescoping rod and an inner surface of the main tube, respectively. Specifically, the outer telescoping surface slidably passes through and establishes a first frictional contact with the first inner surface of the area-narrowing feature and the second outer surface slidably engages and establishes a second frictional contact with the interior-main surface. In its assembled state, the area-narrowing feature and the area-expanding feature of the present supporting assemblies facilitate slidable engagement of said telescoping rod to expand out of or retract inside, without decoupling from, the main tube. Moreover, the present supporting assemblies are still sufficiently rigid to hold together the main tube and the telescoping rod and bear the load of equipment, such as sensors including a imaging device, radar, batteries, and telemetry, in a manhole.

The main tube, at or near the second end, has defined therein an aperture, which is preferably oval-shaped and is designed to engage with a component or a hook portion of the first bracket. Preferably, in an assembled and installed state of the present supporting assemblies, aperture of the main tube slides into the component or the hook portion of the first bracket at an angle to the horizon (i.e., x-y plane) or at an angle perpendicular to the horizon (i.e., x-y plane). In this preferred embodiment, the main tube (e.g., main tube 502 of FIG. 5A) is captured in a crotch region (e.g., a crotch region in hook portion 518 of FIG. 5A) of the first bracket (e.g., first bracket 514 of FIG. 5A). This preferred embodiment of the supporting assembly makes it straightforward to install and remove the main tube or the supporting assembly, while minimizing the probability that a person will accidentally knock the main tube or the supporting assembly off from the first bracket.

In accordance with one preferred arrangement of the supporting assembly, the second bracket is mounted on a side opposite to the side of the sidewall that has the first bracket attached to it. The telescoping rod, at the terminating end, has a structural provision for engaging with a second bracket. In one arrangement, the structural provision includes fitting, at the end of the telescoping rod, a bulb or a mushroom, which is captured in a ridge of a, preferably, horseshoe-shaped second bracket. Further, proximate to the terminating end of the telescoping rod that couples to the second bracket, the telescoping rod has defined there in an aperture, through which a pin is introduced to prevent accidentally knocking out the telescoping tube from the main tube. By way of example, one member chosen from a group comprising clip or bracket, chain or cable, clamp and cam lock is used to attach the telescoping rod to the second bracket.

FIG. 1 shows a supporting subassembly 100, according to one embodiment of the present arrangements, including a hollow main tube 102 that is designed to receive a portion of a telescoping tube 104. In this embodiment, main tube 102 includes an interior main surface that defines a cavity having disposed therewithin, at the first end, an area-narrowing feature 108. Area-narrowing feature 108 includes a first inner surface that defines a first aperture spanning a first inner cross-sectional area. Although the first inner cross-sectional area shown in FIG. 1 is circular shaped its shape is not so limited. The first inner cross-sectional area may be of other shapes such as triangular, rectangular and square. Regardless of its shape, main tube 102 has disposed therewithin an area-expanding feature 110, which includes a second outer surface. In this configuration, area-narrowing feature 108 effectively reduces the cross-sectional area of the main tube to be that of the first inner cross-sectional area.

In the embodiment shown in FIG. 1, main tube 102 includes an interior-main surface that defines a cavity is circular shaped. In corresponding fashion, both the outer-telescoping surface of the telescoping rod and the first aperture are also circular shaped. In this embodiment, the cavity of main tube 102 has disposed therewithin, at the first end, an area-narrowing feature 108, which is essentially a diameter-narrowing feature as it narrows the effective diameter of main tube 102 from an interior-main diameter, $D_M$, to a first inner diameter, $d_{1i}$. In contrast, area-expanding feature 110 is a diameter-expanding feature as it expands the effective diameter of the telescoping rod from a second inner diameter, $d_{2i}$, which is a relatively small value and that spans a cross-section of the outer-telescoping surface, to a relatively large second outer diameter, $d_{2o}$. In one embodiment of the present arrangements, the first inner diameter, $d_{1i}$, ranges from about 10 mm to about 30 mm and the second outer diameter, $d_{2o}$, ranges from about 15 mm to about 35 mm.

As shown in FIG. 1, main tube 102 has defined therein, at a second end, a main-tube-connecting aperture 112 and telescoping rod 104 includes, at or near a terminating end 106, an engaging portion. As will be explained later, a first bracket at one end engages with main-tube-connecting aperture 112 (to couple main tube 102 to the first bracket) and at another end is coupled to a sidewall inside an opening, e.g., a manhole. Similarly, one end of a second bracket engages with the engaging portion, which is proximate to terminating end 106, and another end of second bracket is coupled to an opposite sidewall (i.e., opposite side to the sidewall that has secured thereon another end of the first bracket) inside the opening.

Figure 2:
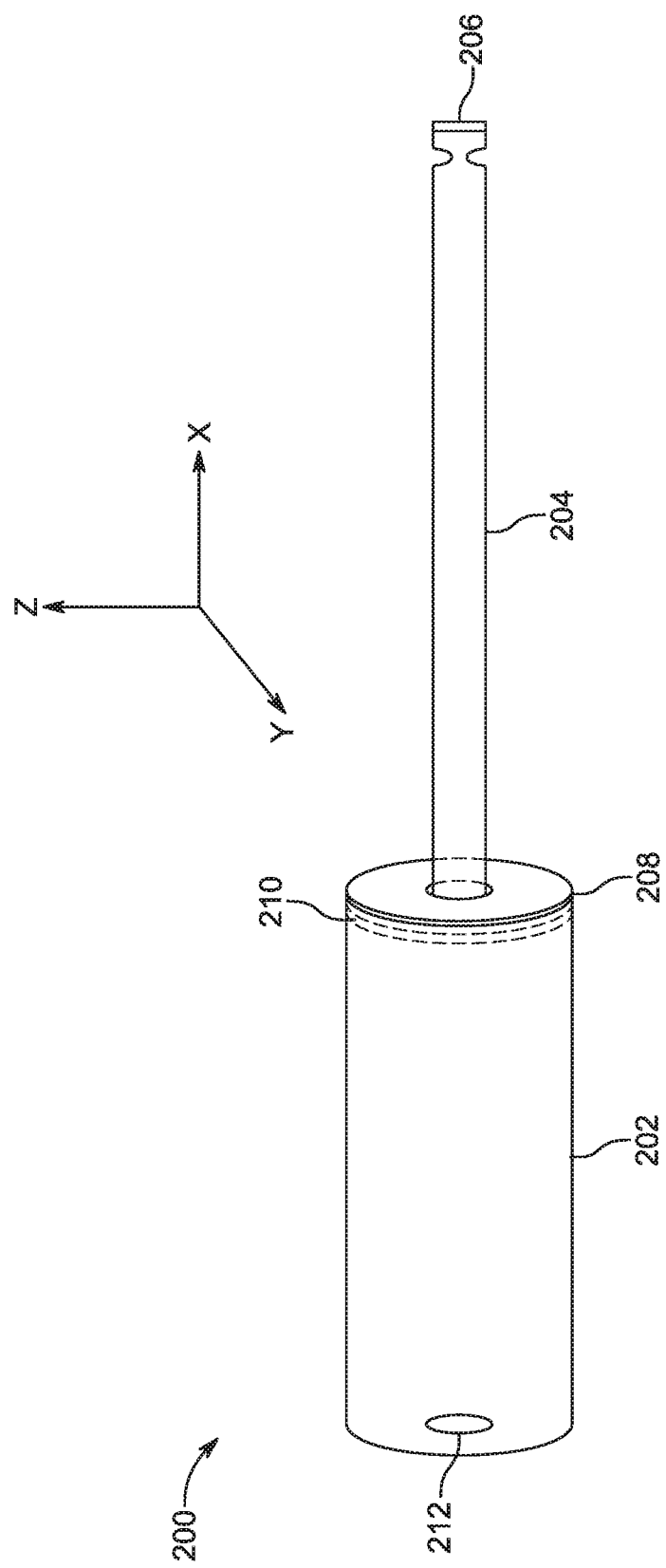
FIG. 2 shows a side view of the supporting subassembly shown in FIG. 1, but the telescoping rod being disposed in an expanded state inside the main tube.

FIG. 1 shows supporting assembly 100 in a retracted state and FIG. 2 shows a fully extended state of supporting assembly 200, which is substantially similar to supporting assembly 100 of FIG. 1. Stated another way, main tube 202, telescoping rod 204, terminating end 206, area-narrowing feature 208, area-expanding feature 210, and main-tube-connecting aperture 212 are substantially similar to their counterparts main tube 102, telescoping rod 104, terminating end 106, area-narrowing feature 108, area-expanding feature 110, and main-tube-connecting aperture 112 of FIG. 1, except that a portion of telescoping rod 104 that resides inside main tube 102 as shown in FIG. 1, extends or telescopes out of main tube 202 in FIG. 2.

In other words, in a retracted state, a portion of telescoping rod 104 retracts into and resides inside main tube 102. In a fully extended state, however, substantially all of telescoping rod 204, except for portions of telescoping rod 204 that have disposed thereon area-expanding feature 210 and area-narrowing feature 208, extends out of and no longer resides inside main tube 202. According to the present teachings, supporting subassembly 200 may be partially or fully extended as shown in FIG. 2, and not in a retracted state as shown in FIG. 1, when it is undergoing installation inside an opening. During a typical operative state of supporting assembly 200 of FIG. 2, the supporting subassembly is rarely fully extended. Further, when the supporting subassembly is not fully extended, there is some overlap between the main tube 202 and telescoping rod 204. This overlap provides a requisite amount of rigidity that is preferred during an operative state of the supporting subassembly.

However, in the fully extended state, when a substantial portion of the outer-telescoping surface slidably passes through the first inner surface, the area-narrowing feature 208 abuts area-expanding feature 210, preventing decoupling of main tube 202 and telescoping rod 204. With the two features abutting each other, surfaces of area-narrowing feature 208 and area-expanding feature 210 face each other and fully contact each other and thereby prevent any further horizontal displacement (i.e., displacement in an x-direction) or further telescoping of telescoping rod 204 inside main tube 202 As a result, during a process or removing the supporting assemblies of the present arrangement to address an urgent matter that requires rapidly accessing the opening inside a manhole, there is no risk that telescoping rod 204 will completely slide out of main tube 202.

The present teachings recognize that limiting the lateral displacement of telescoping rod 204 in a single direction (i.e., x-direction), with little or no displacement in a y-direction and/or in z-direction, makes for easier handling of the present supporting assemblies and prevents loss of the telescoping rod during installation and/or disassembly of the supporting assembly. By way of example, the y-direction and/or z-direction displacement of telescoping rod 204 is less than about 3° from an x-z plane and/or from an x-y plane, respectively. The x-z plane is a plane that extends in the x-direction and the z-direction and the x-y plane extends in the x-direction and the y-direction. In some instances when a significant portion of the telescoping rod is in a retracted position inside the main tube, the y-direction and/or z-direction displacement of the telescoping rod is less than about 1° from the x-z plane and/or the x-y plane.

FIG. 3A shows a supporting assembly 300, according to one embodiment of the present arrangements and that includes a main tube 302 and a telescoping rod 304, which are substantially similar to main tube 102 and telescoping rod 104 of FIG. 1. In this arrangement of FIG. 3A, main tube 302 is coupled to a first bracket (coupling region denoted by "A") and telescoping rod 304 is coupled to a second bracket (coupling region denoted by "B"). To this end, FIG. 3B shows in greater detail the coupling between main tube 302 and a first bracket 314 and FIG. 3C shows in greater detail the coupling between telescoping rod 304 and second bracket 316.

According to FIG. 3B, main tube 302 has defined therein, at or near one end, a main-tube-connecting aperture 312, which is substantially similar to aperture 112 of FIG. 1. Further, first bracket 314 includes a hooked portion that engages with main-tube-connecting aperture 312. Specifically, the hooked portion of the first bracket hooks into main-tube-connecting aperture 312, which is preferably oval shaped, to secure main tube 302 to first bracket 314. In this configuration, the hook portion of the first bracket is at an angle to the horizon (i.e., x-y plane) or at an angle perpendicular to the horizon (i.e., x-y plane). In this preferred embodiment, the main tube (e.g., main tube 502 of FIG. 5A) is captured in a crotch region (e.g., a crotch region in hook portion 518 of FIG. 5A) of the first bracket (e.g., first bracket 514 of FIG. 5A). As a result, this preferred embodiment of the supporting assembly makes it straightforward to install and remove the main tube or the supporting assembly, while minimizing the probability that a person will accidentally knock the main tube or the supporting assembly off from the first bracket.

According to FIG. 3C, at or near the terminating end (e.g., one that is substantially similar to terminating end 106 of FIG. 1), telescoping rod 304 engages with a second bracket 316. In one embodiment of the present arrangements, at the terminating end, telescoping rod 304 includes an engaging portion (e.g., a radially extending linear slot or channel shaped opening 1428 in FIG. 14, or a spherical bulb 1428 in FIG. 14) that engages with a securing portion (e.g., ridge 1432 and 1532 of FIGS. 14 and 15, respectively) of the second bracket. FIG. 3C also shows that, at or near terminating end, the telescoping rod 304 has defined therein a telescoping-rod-connecting aperture. In an installed state of supporting assembly 300, a fastening member (e.g., a pin) engages with the telescoping-rod-connecting aperture to prevent decoupling of telescoping rod 304 from main tube 302.

Figure 4:
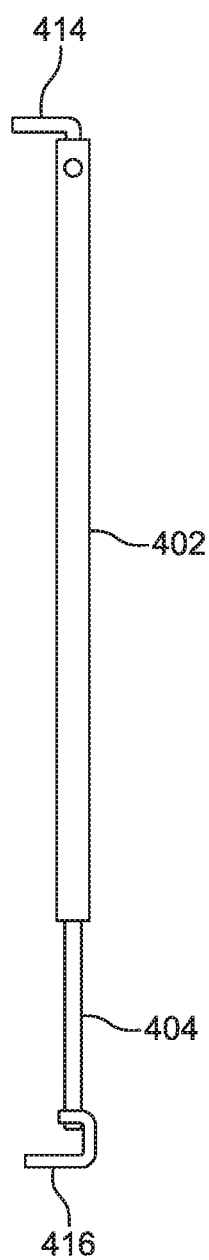
FIG. 4 shows a side view of the supporting assembly shown in FIG. 3A.

FIG. 4 shows a supporting assembly 400 that is a side view of supporting assembly 300 of FIG. 3A. Supporting assembly 400 includes a main tube 402, a telescoping rod 404, a first bracket 414 and a second bracket 416 that are similar to their counterparts, i.e., main tube 302, telescoping rod 304, first bracket 314 and second bracket 316 of FIG. 3A, respectively.

Figure 5B:
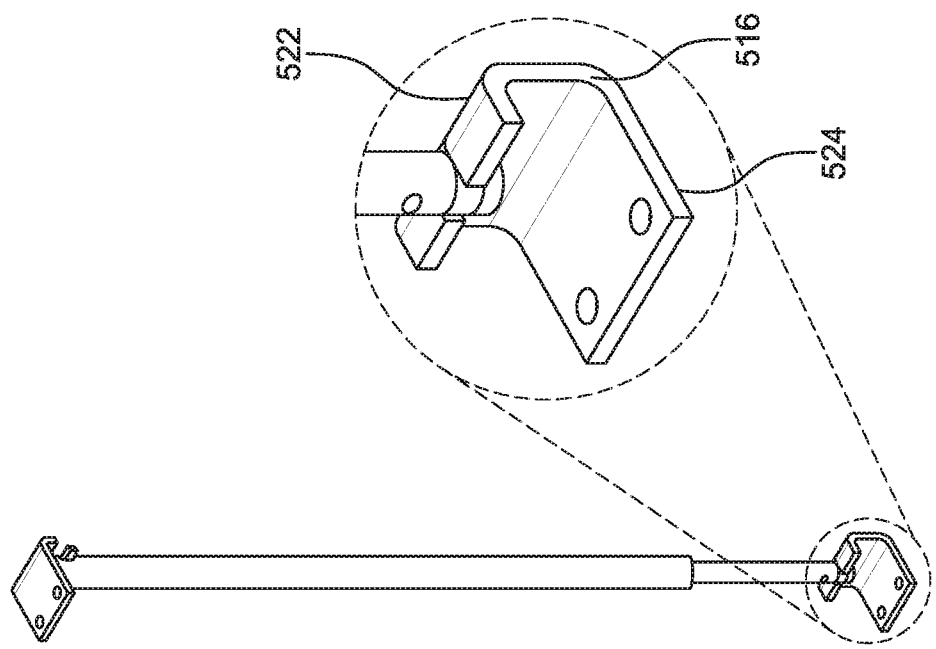
FIG. 5B shows a perspective view of the support assembly shown in FIG. 4 and a magnified perspective view of the coupling between the second bracket and the telescoping rod.
Figure 5A:
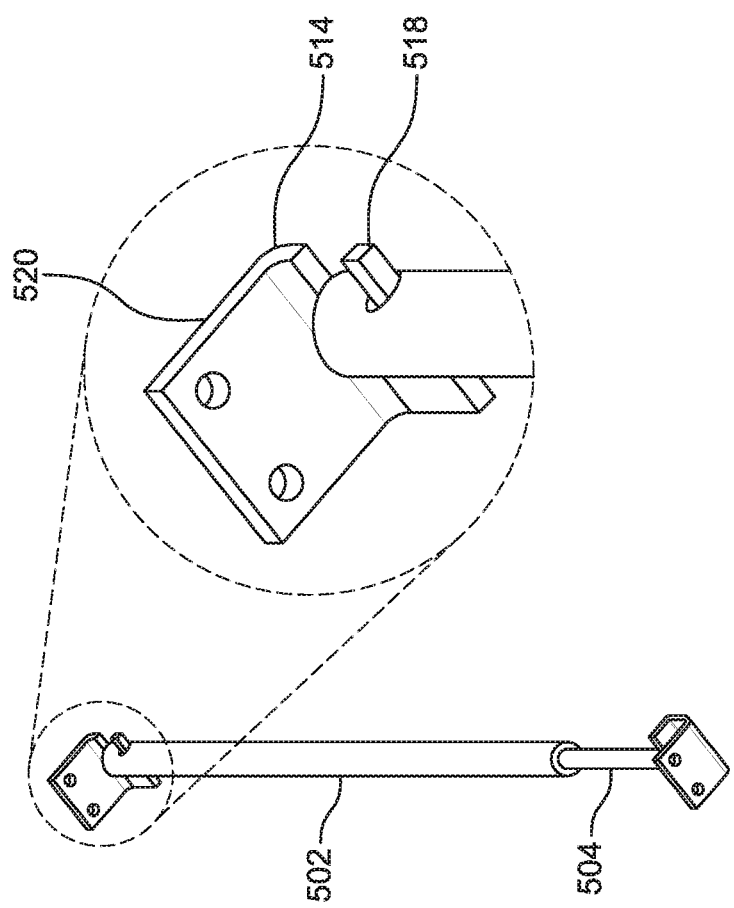
FIG. 5A shows a perspective view of the support assembly shown in FIG. 4 and a magnified perspective view of the coupling between the first bracket and the main tube.

FIG. 5A shows in greater detail coupling of a main tube 502 and a first bracket 514, both of which are substantially similar to main tube 302 and first bracket 314 of FIG. 3B, respectively. FIG. 5A further shows that first bracket 514 includes a wall portion 520, which has multiple apertures defined therein, and a hook portion 518 that engages with or hooks into a main-tube-connecting aperture defined in main tube 502.

FIG. 5B shows a telescoping rod 504 coupled to a second bracket 516, which is substantially similar to second bracket 316 of FIG. 3C. Second bracket 516 includes a securing portion 522 and a supporting portion 524, which may be substantially similar to wall portion 520 of first bracket as they both have defined therein multiple apertures, which are used for attaching their respective brackets to opposite areas of a sidewall inside an opening. As explained before in connection with FIG. 3C, FIG. 5B shows an engaging portion (e.g., a linear slot or a channel-shaped opening that radially extends on the telescoping rod) engages with a secured portion (e.g., a ridge).

In one embodiment of the present arrangements, securing portion 522 of FIG. 5B is horseshoe-shaped having two prongs within which the ridge is disposed. Each prong has defined therein aligning apertures extending in a direction perpendicular to a direction in which engaging portion 518 engages with securing portion 522. In this embodiment, a locking mechanism including a pin is used to lock into place the coupling action of engaging portion 518 and securing portion 522 by having the pin pass, through the aligned apertures, in perpendicular to the direction in which engaging portion engages with the securing portion. As a result, in an installed state of the present supporting assemblies, the locking mechanism prevents the decoupling of the telescoping rod from the second bracket.

Figure 6A:
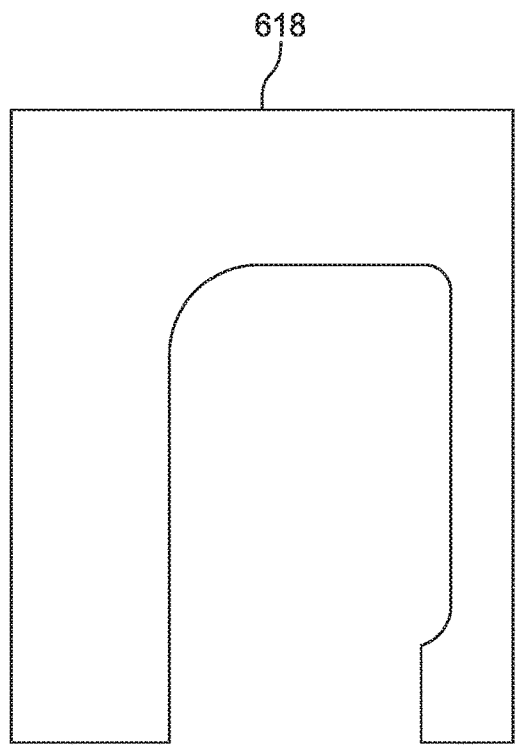
FIGS. 6A-6F show different views of the first bracket as shown in FIGS. 3A, 3B and 4 and that includes a wall portion that is designed to couple to one side of a sidewall inside an opening (e.g., manhole) and a hook portion that couples to the main tube shown in FIGS. 1, 2, 3A, 3B, 4 and 5A.
Figure 6B:
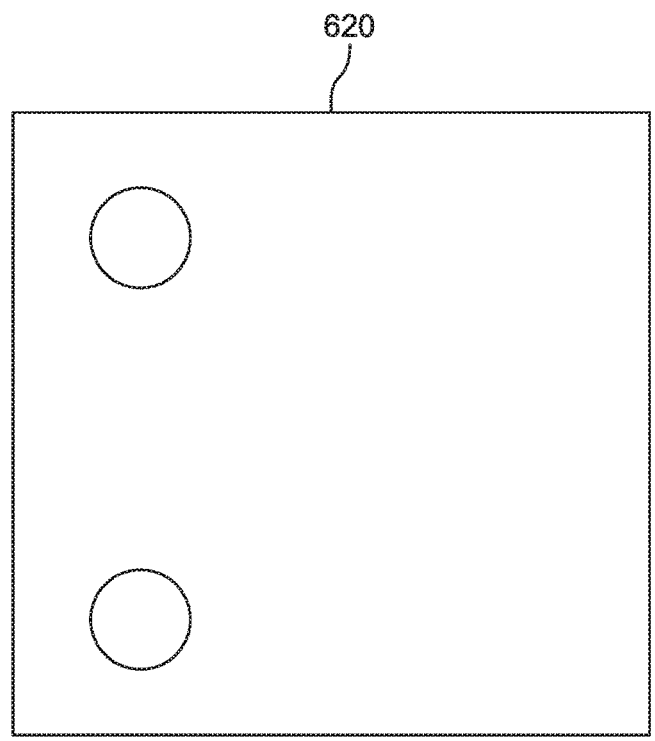
Figure 6C:
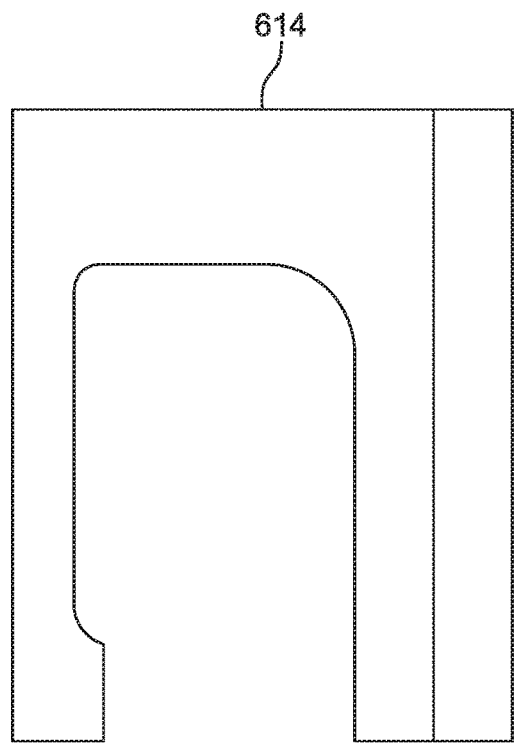
Figure 6D:
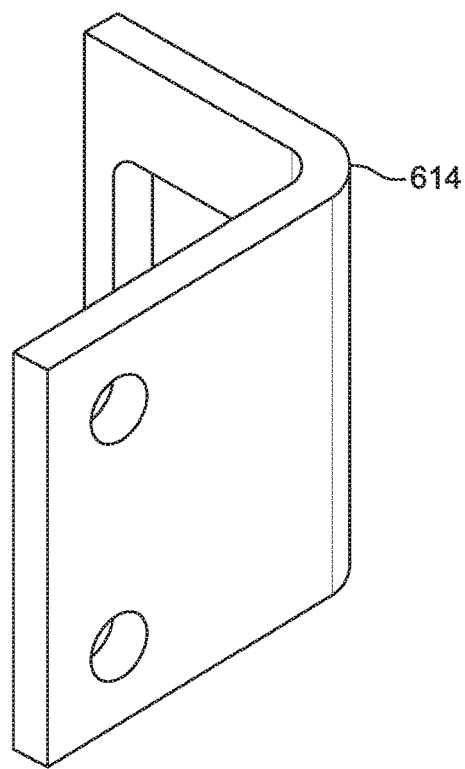
Figure 6E:
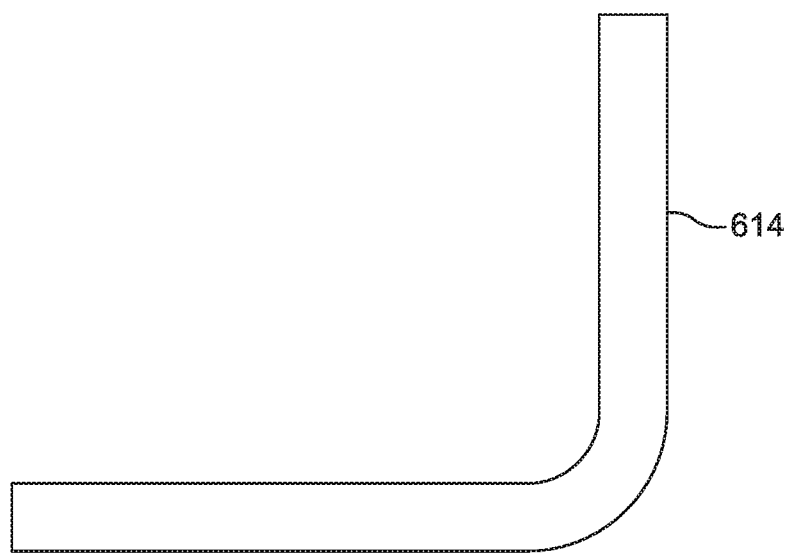
Figure 6F:
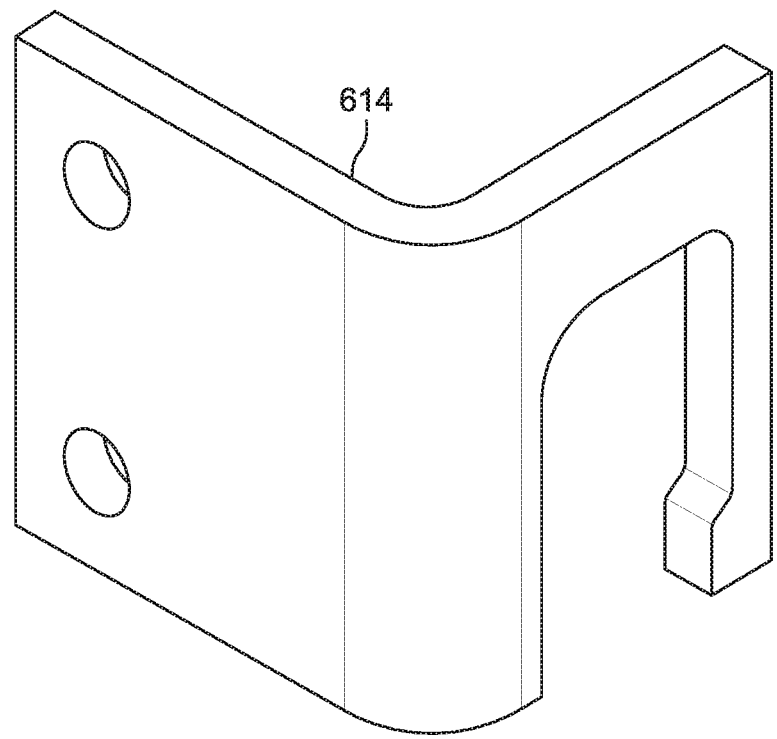

FIGS. 6A-6F show different views of a first bracket. FIG. 6A shows a side view of the first bracket and more clearly shows a hook portion 618, which is substantially similar to hook portion 518 of FIG. 5A. FIG. 6B shows a front view of a wall portion 620, which is substantially similar to wall portion 520 of the first bracket. FIG. 6C shows a back view of first bracket 614. FIG. 6D a perspective view of first bracket 614. FIG. 6E shows a different side view of first bracket 614. FIG. 6F shows another perspective view of first bracket 614. According to FIGS. 6A-6F, hook portion 618 of a first bracket is capable of hooking or penetrating into the main-tube-connecting aperture in a lateral direction (i.e., in the x-y plane).

Figures 7A, 7B:
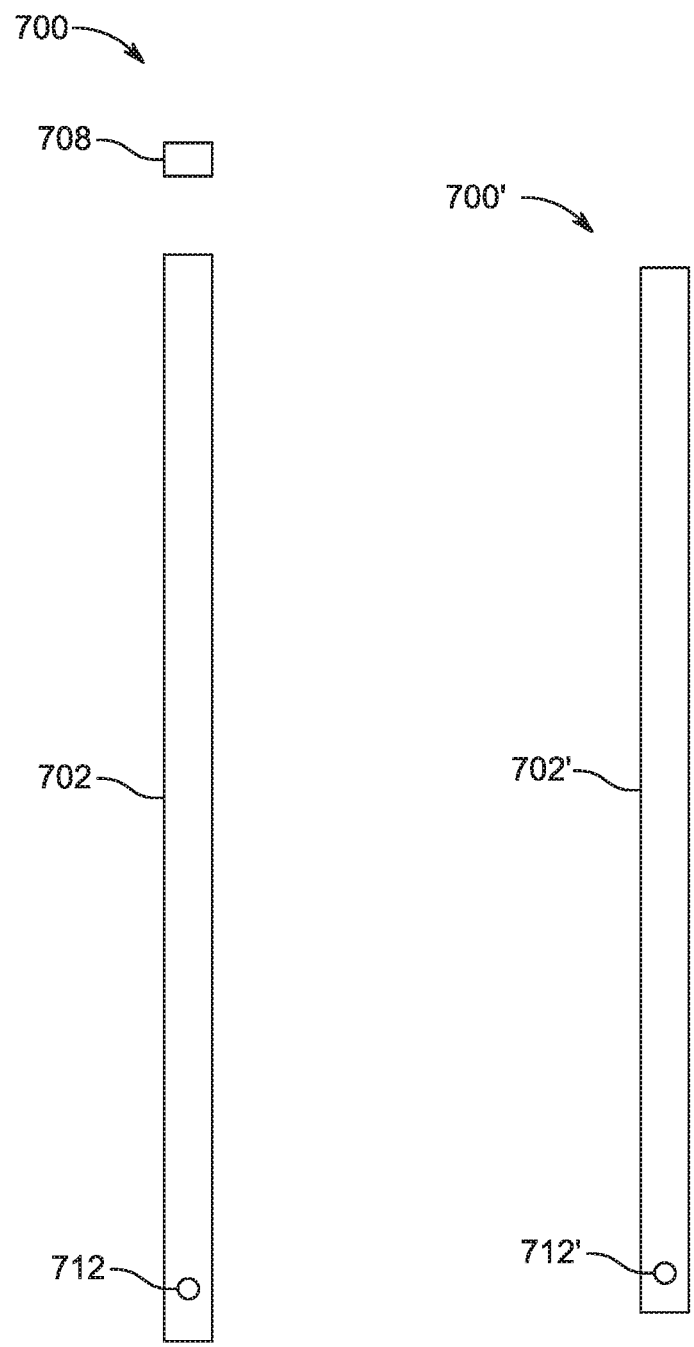
FIG. 7A shows a side view of a first annular component, according to one embodiment of the present arrangements, in an unassembled state with and adjacent to the main tube shown in FIGS. 1, 2, 3A, 3B, 4 and 5A.
FIG. 7B shows a side view of the first annular component of FIG. 7A assembled with the main tube shown in FIGS. 1, 2, 3A, 3B, 4, 5A and 7A.

FIG. 7A shows a side, exploded view of a partial supporting subassembly 700, according to one embodiment of the present arrangements. In this unassembled state supporting subassembly 700, a main tube 702 is shown separated from a discrete component. In this embodiment, the discrete component is a first annular component 708 that includes an area-narrowing feature. In one embodiment of the present arrangements first annular component 708 is a bushing.

As explained before, main tube 702 has defined therein, at a second end, a main-tube-connecting aperture which allows engagement with a hook portion of the first bracket (e.g., first bracket 614 including hook portion 618 shown in FIGS. 6A, 6C, 6D, 6F). FIG. 7B shows an assembled partial supporting subassembly 700', according to one embodiment of the present arrangements and that includes a main tube 702' having housed therein the first annular component (which was shown in an unassembled state in FIG. 7A and denoted by reference numeral 708).

Figures 8A, 8B:
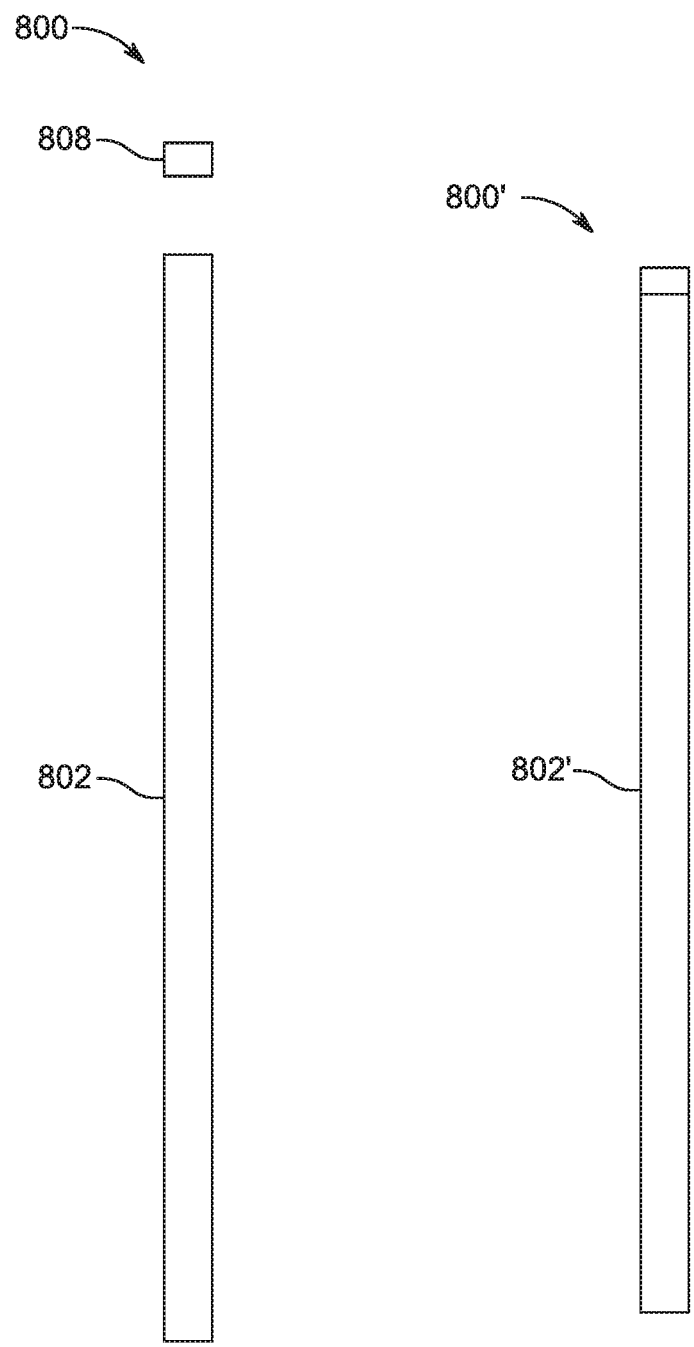
FIG. 8A shows a top view of the first annular component, shown in FIG. 7A in an unassembled state, and adjacent to a main tube shown in FIGS. 1, 2, 3A, 3B, 4 and 5A.
FIG. 8B shows a top view of the first annular component of FIG. 8A assembled adjacent to the main tube shown in FIGS. 1, 2, 3A, 3B, 4, 5A and 7A.

FIG. 8A shows a top, exploded view of a partial supporting subassembly 800. In unassembled state of partial supporting subassembly 800, a main tube 802 is separated from another discrete component, second annular component 808. In this embodiment, second annular component 808 includes an area-narrowing feature. FIG. 8B shows an assembled partial supporting subassembly 800', according to one embodiment of the present arrangements and that includes a main tube 802' that is attached adjacent to, as opposed to having housed therein, the first annular component (which was shown in an unassembled state in FIG. 7A and denoted by reference numeral 808).

Figure 9:
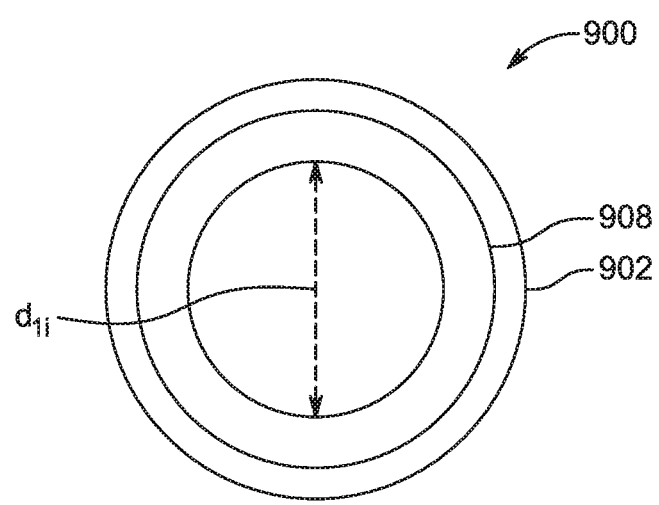
FIG. 9 shows a cross-sectional view of the main tube shown in FIGS. 1, 2, 3A, 3B, 4, 5A and 7A and having installed adjacent thereto the first annular component.

FIG. 9 shows a cross-sectional view of a partially assembled supporting assembly 900, according to one embodiment of the present arrangements. According to this figure, main tube 902 is attached to a first annular component 908, which is preferably disposed in the shape of an annulus and has defined therein, at a center region, a first aperture that allows a telescoping rod to pass through. The first aperture spans a first inner diameter, dii, and includes first inner surface. In an assembled state of the present supporting assemblies, the outer-telescoping surface slidably passes through and establishes a first frictional contact with the first inner surface.

Figures 10A, 10B:
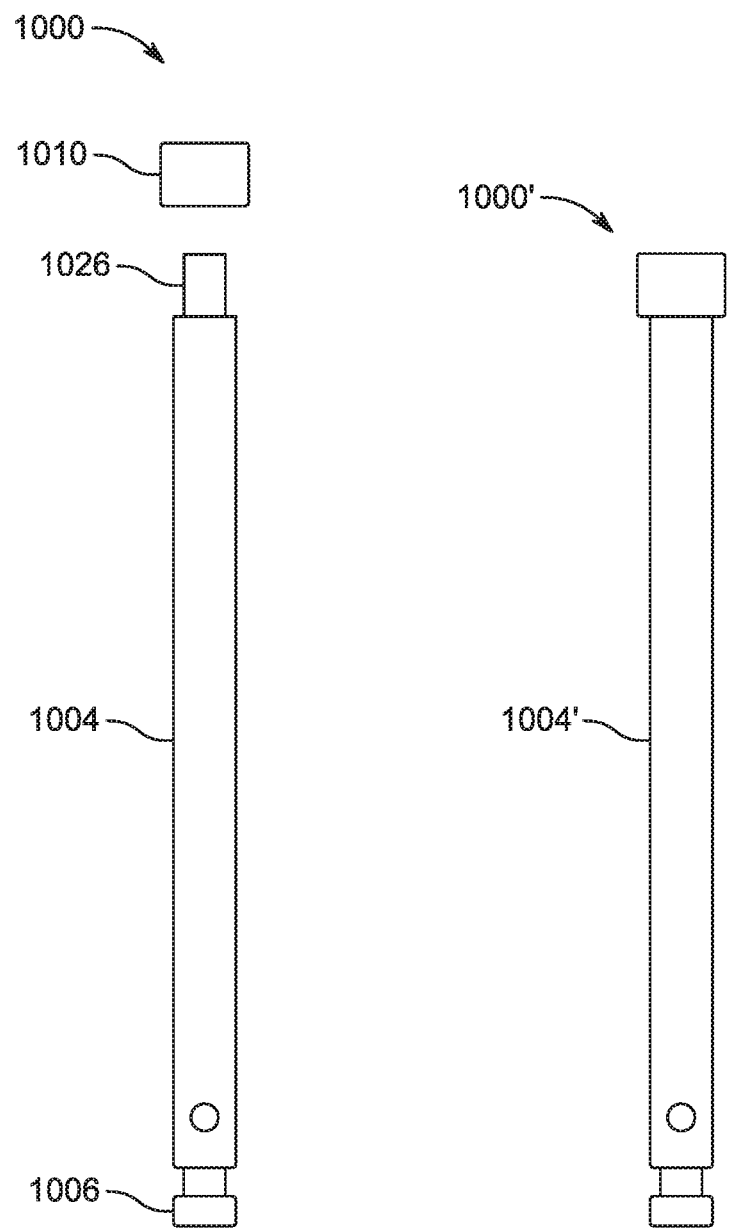
FIG. 10A shows a side view of a second annular component, according to one embodiment of the present arrangements, in an unassembled state with and adjacent to the telescoping rod shown in FIGS. 1, 2, 3A, 3C, 4 and 5B.
FIG. 10B shows a side view of the second annular component of FIG. 10A assembled with the telescoping rod shown in FIGS. 1, 2, 3A, 3C, 4, 5B and 10A.

FIG. 10A shows a side, exploded view of a partial supporting subassembly 1000, according to one embodiment of the present arrangement. In this unassembled state of partial supporting subassembly 1000, a telescoping rod 1004, at or near a connecting end, includes a relatively smaller-outer-diameter region 1026 that fits into a second aperture defined within a second annular component 1010 such that a position of second annular component 1010 is secured and confined on relatively smaller-outer-diameter region 1026 of telescoping rod 1004, and second annular component 1010 does not displace onto a main portion of telescoping rod 1004. The main portion of the telescoping rod refers to a portion that does not include the relatively smaller-outer-diameter region. In FIG. 10A, telescoping rod 1004 is shown separated from first annular component 1010 (which in one embodiment of the present arrangements is a "bushing"). As explained before, telescoping rod 1004 has defined therein, at or near a terminating end (that is opposite to the connecting end), a telescoping-rod-connecting aperture which allows engagement with a pin. Further, at or near the terminating end, telescoping rod 1004 includes an engaging portion that engages with a securing portion, including a ridge (e.g., ridge 1432 of FIG. 14 and ridge 1532 of FIG. 15), of a second bracket (e.g., a second bracket 1430 of FIG. 14 and a second bracket 1530 of FIG. 15). FIG. 10B shows an assembled supporting subassembly 1000', according to one embodiment of the present arrangements and that includes a telescoping rod 1004' having disposed thereon the second annular component (which was shown in an unassembled state and denoted by reference numeral 1010 in FIG. 10A).

Figures 11A, 11B:
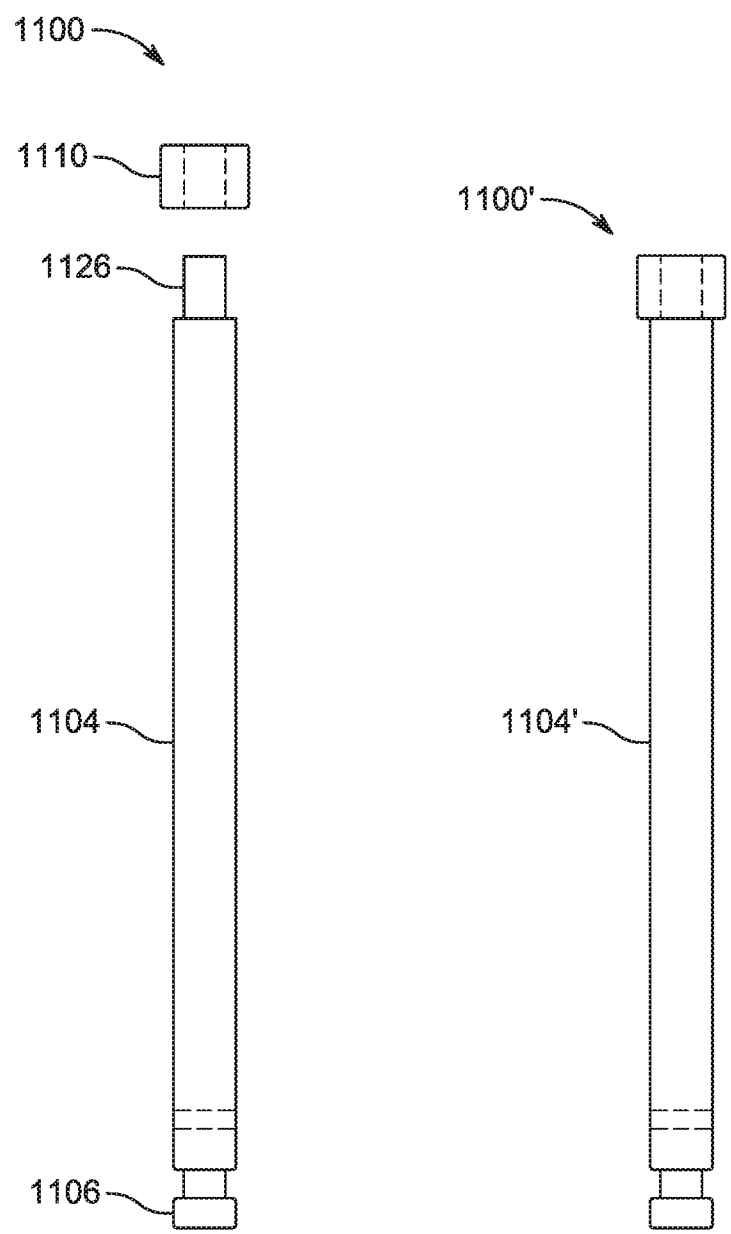
FIG. 11A shows a top view of the second annular component of FIG. 10A in an unassembled state with and adjacent to the telescoping rod shown in FIGS. 1, 2, 3A, 3C, 4, 5B, 10A and 10B.
FIG. 11B shows a top view of the second annular component of FIG. 11A assembled with the telescoping rod shown in FIGS. 1, 2, 3A, 3C, 4, 5B, 10A, 10B and 11A.

FIG. 11A shows a top, exploded view of a partial supporting subassembly 1100, according to another embodiment of the present arrangements. In unassembled state of partial supporting subassembly 1100, a telescoping rod 1104, including a relatively smaller-outer-diameter region 1126, is separated from a second annular component 1110 that includes the area-expanding feature. In this embodiment, instead of having defined therein a telescoping-rod-connecting aperture, the terminating end 1106 has defined therein channels and/or crimps that may be used to prevent decoupling of the telescoping rod from the main tube. FIG. 11B shows an assembled supporting subassembly 1100', which is a top view of supporting assembly 1100 shown in FIG. 11A and that shows a top view of a telescoping rod 1104' having housed or disposed thereon second annular component (which was shown in an unassembled state in FIG. 11A and denoted by reference numeral 1110).

Figures 12A, 12B:
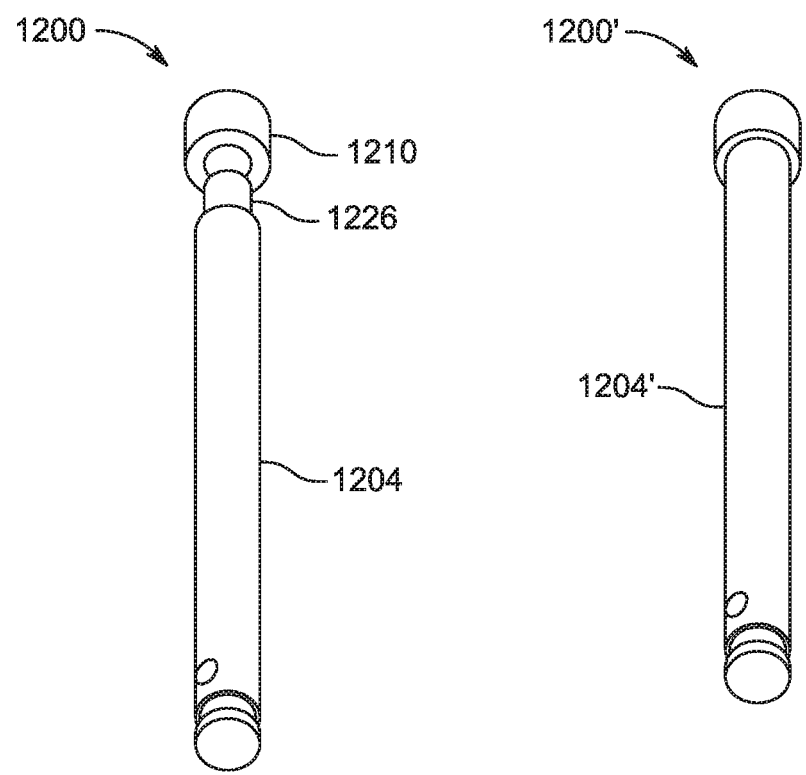
FIG. 12A shows a perspective view of the first annular component of FIGS. 10A and 11A in an unassembled state with and adjacent to the telescoping rod shown in FIGS. 1, 2, 3A, 3C, 4, 5B, 10A, 10B, 11A and 11B.
FIG. 12B shows a top view of the first annular component of FIGS. 10, 11A and 12A assembled with the telescoping rod shown in FIGS. 1, 2, 3A, 3C, 4, 5B, 10A, 10B, 11A, 11B and 12A.

FIG. 12A shows an unassembled partial supporting subassembly 1200, according to one preferred embodiment of the present arrangement. In this configuration, a telescoping rod 1204 includes a relatively smaller-outer-diameter region 1226, which is also known as a bushing mount and that is configured to receive or slide into an aperture of a bushing or a second annular component 1210. FIG. 12B shows the partial supporting subassembly 1200 of FIG. 12A in an assembled state denoted by reference numeral 1200'.

Figure 13:
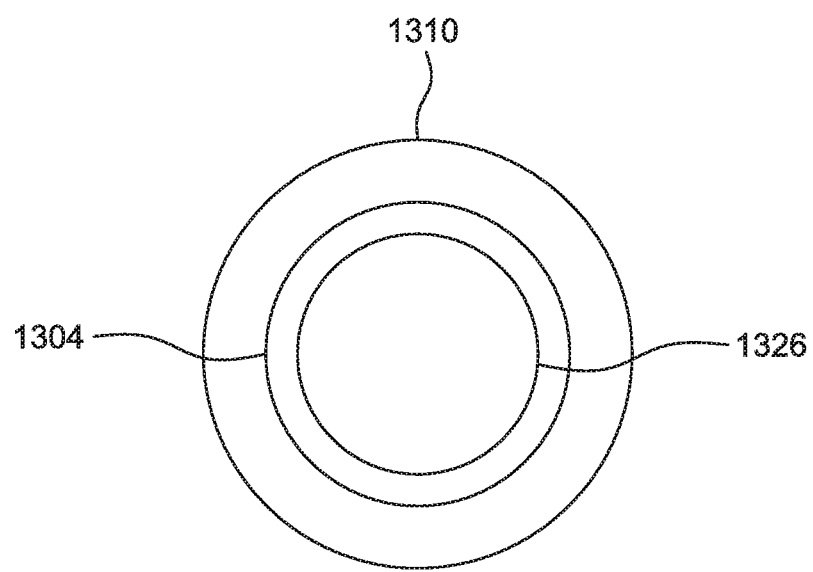
FIG. 13 shows a cross-sectional view of the telescoping rod having fitted thereon the second annular component shown in FIGS. 1, 2, 3A, 3C, 4, 5B, 10A, 10B, 11A, 11B and 12A.

FIG. 13 shows a cross-sectional view of a telescoping rod 1304 that includes a relatively smaller-outer-diameter region or bushing mount 1326 that has preferably disposed around its center region, a bushing or a second annular component 1310.

By way of example, the first outer surface is substantially circular-shaped and spans a first outer diameter ranging from about 14.999 mm to about 34.999 mm. In this example, the cavity spans a main interior diameter ranging from about 15 mm and about 35 mm. As further examples, the second inner diameter ranges from about 10 mm to about 30 mm, and the diameter of the relatively-smaller-outer-diameter rod portion ranges from about 9.999 mm to about 29.999 mm. According to yet another example, the diameter of the relatively-larger-outer-diameter rod portion is smaller than the first inner diameter and ranges from about 9.8 mm to about 29.8 mm.

In certain preferred arrangements of the present supporting assemblies, the main tube and the telescoping rod combine to span a distance ranging from about 2 feet to about 4 feet, and the first inner diameter is about 19 mm, the first outer diameter is about 24.999 mm, the second inner diameter is about 12 mm, the second outer diameter is about 24.85 mm, the diameter of the relatively smaller-outer-diameter rod portion is about 11.99 mm, the diameter of the relatively larger-outer-diameter rod portion is about 18.8 mm, and the interior main diameter is about 25 mm.

Figure 14:
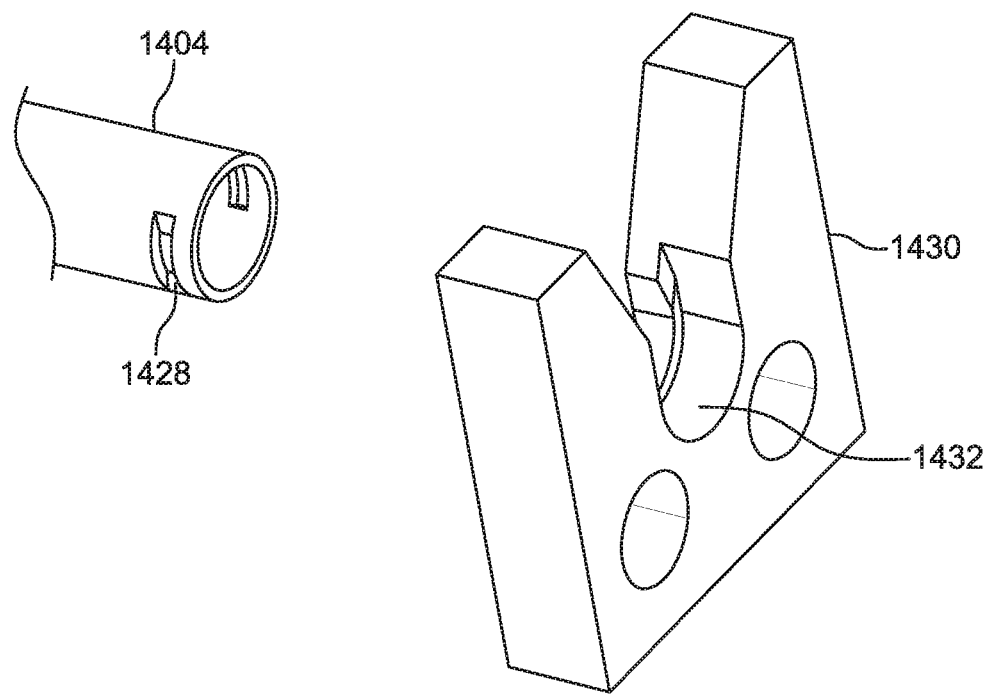
FIG. 14 shows a perspective view of a separate embodiment wherein the telescoping rod that includes two parallel slots which each have defined therein a channel-shaped opening disposed at securing end, for engagement with a ridge of the second bracket.
Figure 15:
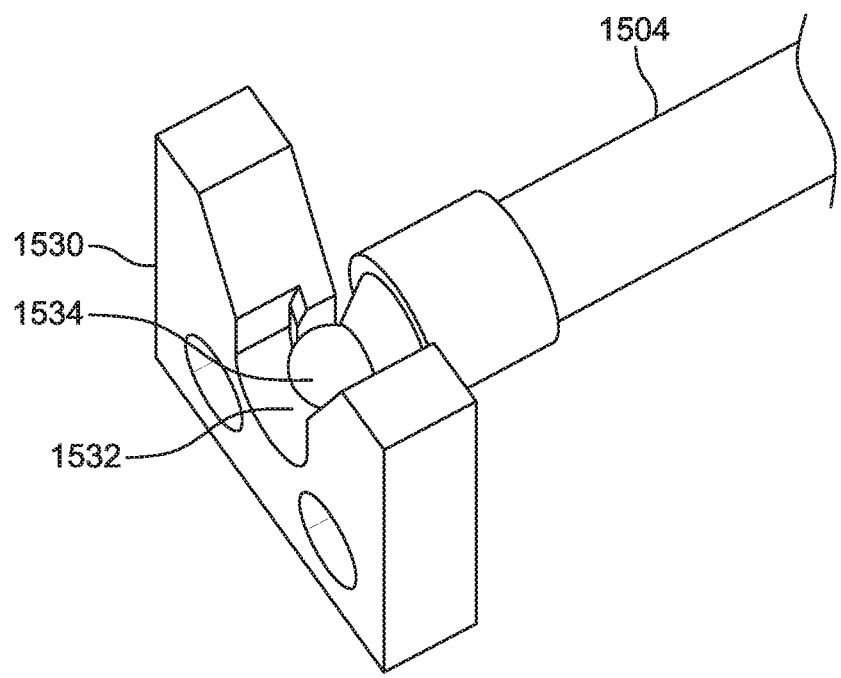
FIG. 15 shows a perspective view of another telescoping rod, according to another embodiment of the present arrangements and that includes a pinched region proximate to a spherical bulb such that, in a coupled configuration of the telescoping rod with the second bracket, the pinched region engages with a ridge of the second bracket.

FIG. 14 shows a telescoping rod 1404, according to one embodiment of the present arrangements and that is hollow and, at one end, is slotted to have defined therein a circular channel 1428, which engages with ridge 1432 of second bracket 1430. FIG. 15 shows a telescoping rode 1504, according to another embodiment of the present arrangements and that includes a pinched region and a relatively larger-outer-diameter region 1534. In a preferred assembled state of supporting subassembly, the pinched region rests on ridge 1532 of a second supporting bracket 1530. At the terminating end, the relatively larger-outer-diameter region may be in the shape of a cap or a round bulb 1534 that is glued to telescoping rod 1504 and is captured by ridge 1532. In this assembled configuration, the cap or the round bulb is captured by ridge 1532 and allows second bracket 1530 to remain in a non-vertical or a horizontal orientation (i.e., in the x-y plane). Further, ridge 1532 may be thought of as a "catch" for catching engaging portion of the telescoping rod 1404.

First and second brackets described herein are preferably manufactured using pressed, rolled, or otherwise bent metal. By way of example, the second bracket includes a J-shaped catch to capture a securing region of the telescoping rod. In this embodiment, a piece of metal is cut out prior to rolling the piece of cut metal to create the "J" shaped bracket.

In accordance with one preferred embodiment of the present arrangements, the main tube, at one end, has defined therein an oval-shaped aperture, which allows at least a portion of the first bracket pass through when a long end of the main tube is tilted vertically, but still prevents first bracket from sliding out of the, preferably oval-shaped, main-tube-connecting aperture when the main tube is horizontal (i.e., in the x-y plane).

A portion of telescoping rod as shown in FIG. 1 slides into a main tube and to prevent an entire length of the telescoping rod from falling out of the main tube, an eyelet or a main-tube-connecting aperture is defined on the main tube that is occupied by a pin. In one embodiment of the present arrangement, the pin is a stainless-steel slotted spring pin, commercially available from McMaster-Carr of Aurora, Ohio. In this embodiment, there is also a beveled or filleted section at one end of the telescoping rod that is designed to slide into the center of a catch present in the second bracket. The resulting hourglass shape of the assembled configuration of telescoping rod and the catch (of the second bracket) allows the telescoping rod and the catch to be at slight angles to each other and still properly function. In other words, the present teachings recognize that the telescoping rod does not need to be perfectly perpendicular to the catch of the second bracket.

Figure 16:
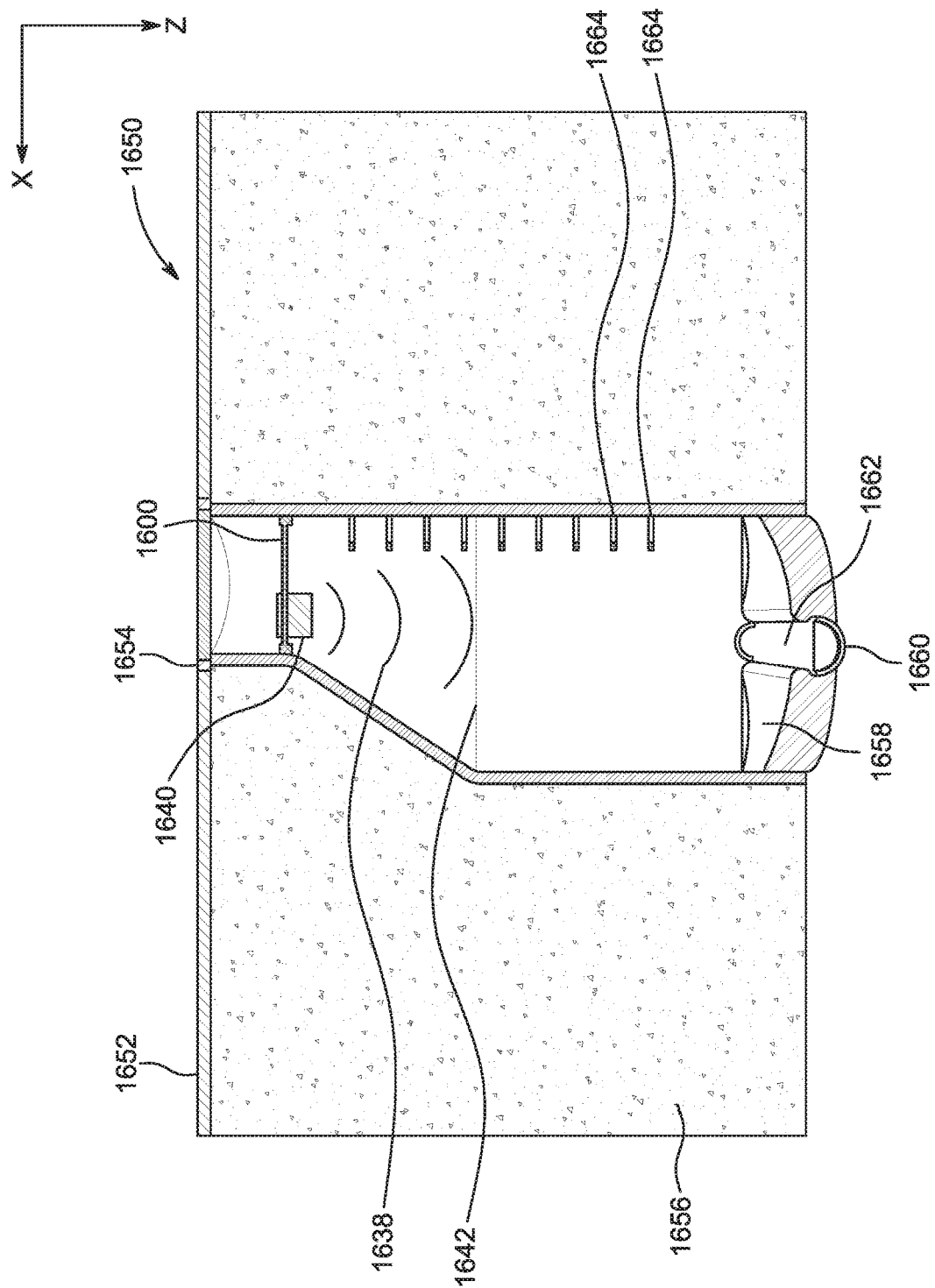
FIG. 16 shows a perspective view of a supporting assembly of the present arrangements that is installed, according to one embodiment of the present arrangements, inside a manhole to monitor fluid levels in a sewage line.

One exemplar application of the supporting assembly of the present arrangements is to support a monitoring and/or maintenance equipment inside a sewer chamber 1650 as shown in FIG. 16. In this embodiment, a supporting assembly 1600 is suspended above a manhole floor at a distance so that a proper signal or image data of the water level, inside the sewer chamber, may be obtained. Inside sewer chamber 1650, supporting assembly 1600 may be of any type that is described herein. Although supporting assembly 1600 may have a radar 1640 and/or a camera secured thereon at any location, in a preferred implementation, however, radar 1640 and/or camera is/are secured on a main tube of supporting subassembly 1600.

Radar 1640 and/or the camera, in this exemplar application, is placed inside a manhole opening defined on an asphalt surface 1652 and having a manhole frame 1654 disposed thereabove. Sewer chamber 1650 extends into and is defined inside soil 1656. Further, inside sewer chamber 1650, a concrete manhole wall 1642 is provided and multiple rungs 1664 provide access from near top of the manhole opening to water level 1662 through a manhole invert 1660. A concrete bench 1658 serves as a floor for the sewer chamber 1650. During an operative state, radar 1640 generates radar waves 1638, which are propagated inside radar enclosure 1650 and the camera collects image data inside radar disclosure 1650.

Figure 17:
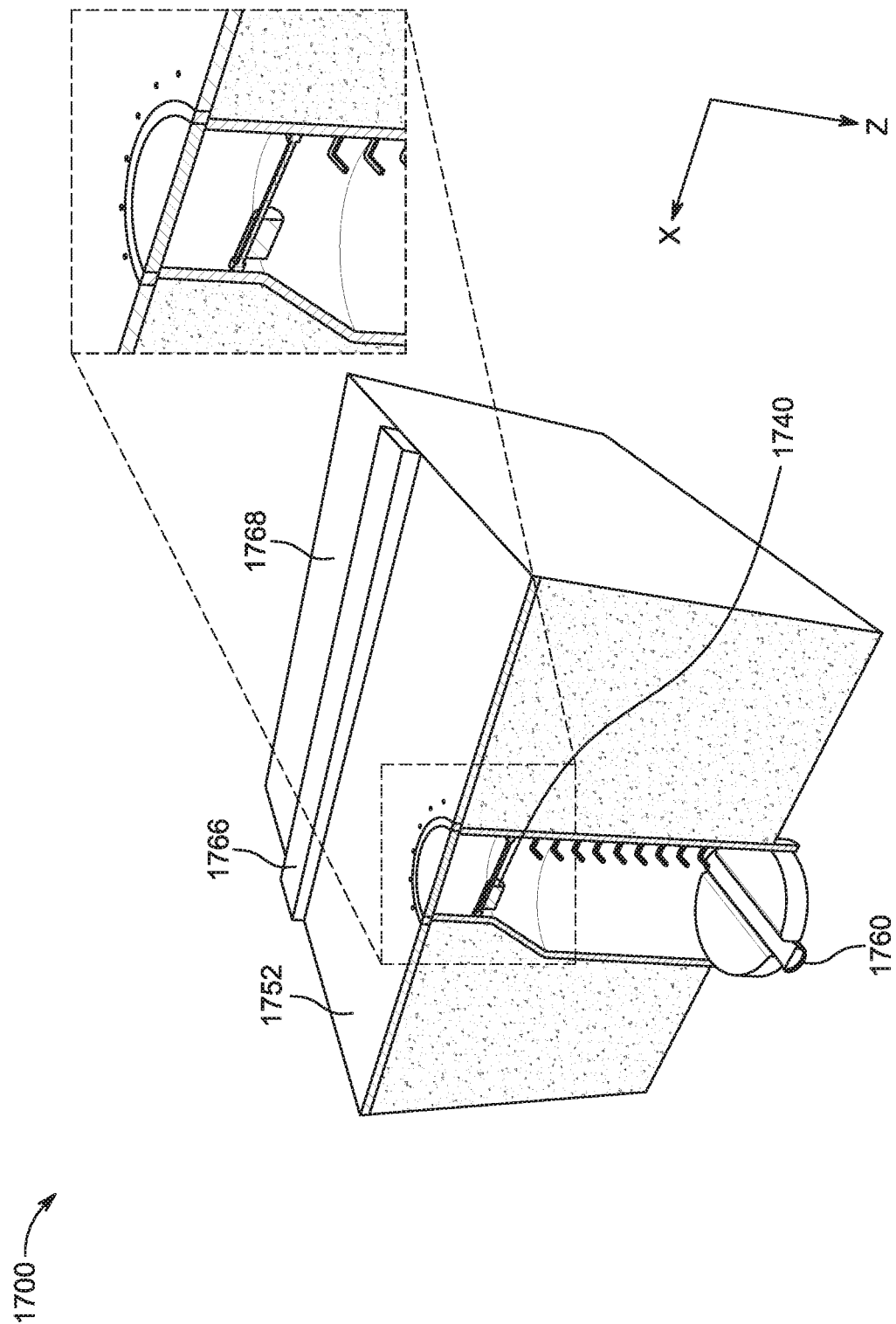
FIG. 17 shows a different perspective view of the supporting assembly of FIG. 16.

FIG. 17 shows a sewer chamber 1750 disposed inside a manhole defined on an asphalt surface 1752 typically next to a curb 1766 and/or grass 1768. A radar 1740, which is substantially similar to radar 1640 of FIG. 16, is positioned, from the ground or asphalt surface 1752, at a distance that ranges from about 24 inches to about 36 inches. Radar 1740 is designed to measure water level of a flow inside manhole invert 1760, which is substantially similar to manhole invert 1660 of FIG. 16. A distance from radar 1740 to manhole invert 1760 ranges from about 6 feet to about 60 feet.

Figure 18:
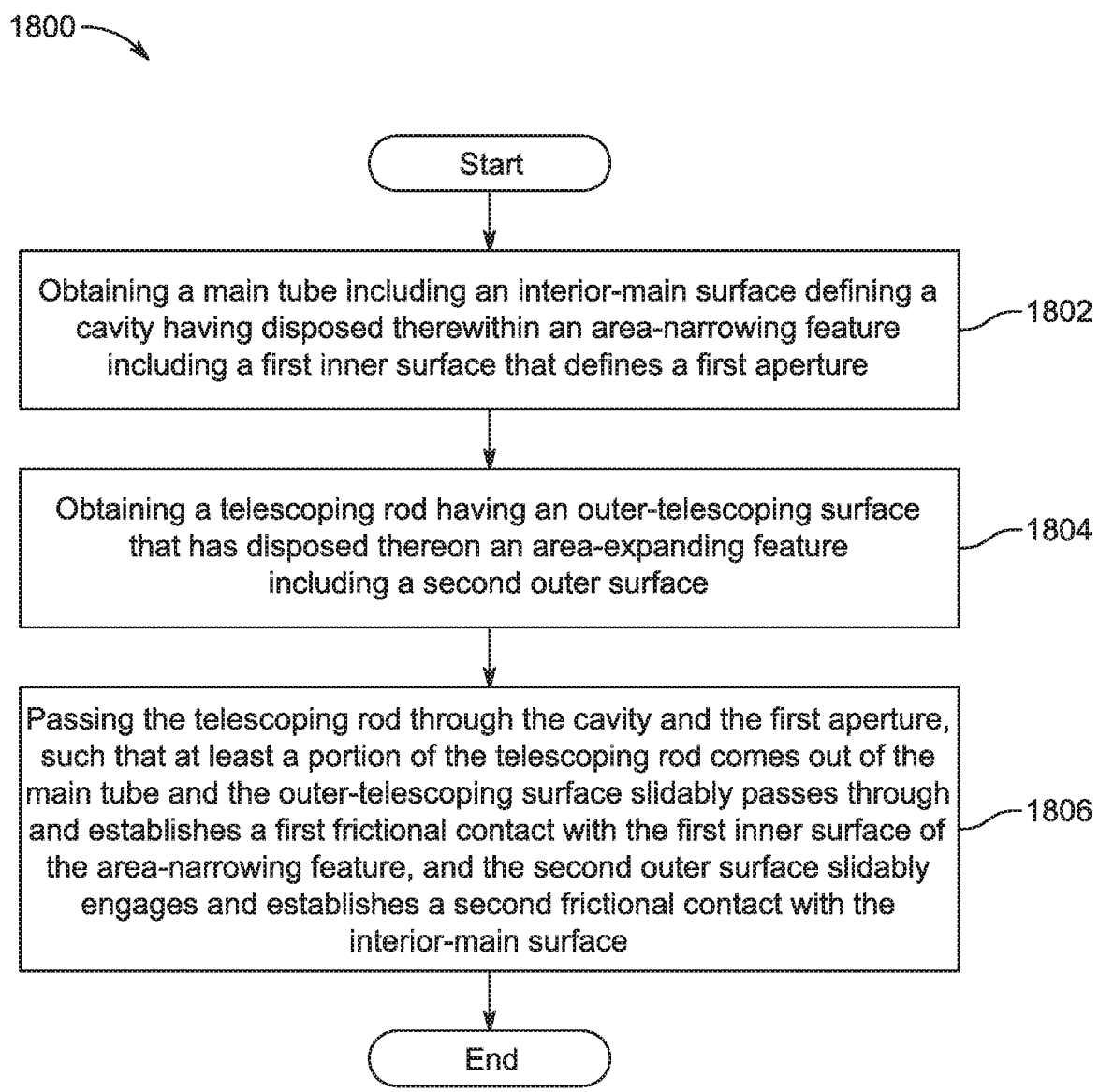
FIG. 18 shows a flowchart for a process, according to one embodiment of the present teachings, for installing the present support assemblies.

The present teachings also provide novel methods for installing the present supporting assemblies. FIG. 18 shows a flowchart for a method 1800, according to one embodiment of the present teachings, for installing a support assembly. Method 1800, preferably, begins with two obtaining steps, i.e., steps 1802 and 1804, that may be carried out in any order. Step 1802 involves obtaining a main tube and step 1804 involves obtaining a telescoping rod. Step 1802 of obtaining a main tube comprises obtaining a main tube including an interior-main surface that extends from a first end to a second end. The interior-main surface defines a cavity having disposed therewithin an area-narrowing feature. In one embodiment, step 1802 of the present teachings includes obtaining a unitary structure of main tube 102 and area-narrowing feature 108 as described in FIG. 1. In an alternate embodiment, this step includes obtaining a main tube subassembly shown in FIGS. 7A, 7B, 8A and 8B.

Step 1804 of obtaining a telescoping rod comprises obtaining a telescoping rod having an outer-telescoping surface that extends from a connecting end to a terminating end. Further, the outer-telescoping surface has disposed thereon, at the connecting end, an area-expanding feature, which includes a second outer surface. In one embodiment, step 1804 of the present teachings includes obtaining a unitary structure of telescoping rod 104 and area-expanding feature 110 as described in FIG. 1. In an alternate embodiment, this step includes obtaining a telescoping rod subassembly shown in FIGS. 10A, 10B, 11A. 11B, 12A and 12B.

After obtaining the unitary structures or subassemblies of main tube and telescoping rod, method 1800 proceeds to a step 1806, which involves passing the telescoping rod through the cavity, at the second end, of the main tube and the first aperture (of the area-narrowing feature) such that at least a portion of the telescoping rod comes out of the main tube. The resulting structural combination of the two unitary structures or two subassemblies is referred to as the "support subassembly."

As a result of step 1806, the outer-telescoping surface slidably passes through and establishes a first frictional contact with the first inner surface of the area-narrowing feature. Further, the second outer surface slidably engages and establishes a second frictional contact with the interior-main surface of the main tube. Further still, the area-narrowing feature and the area-expanding feature enable slidable engagement of the telescoping rod to expand out of or retract inside, and without decoupling from, the main tube.

The next two steps of coupling and engaging the support subassembly to the brackets may be done in any order. The present methods of installing include a step of coupling a hook portion (e.g., hook portion 518 of FIG. 5A) of a first bracket (e.g., first bracket 514 of FIG. 5B) with a main-tube-connecting aperture (e.g., main tube connecting aperture 312 of FIG. 3B) defined at, or proximate to, the second end of the main tube to couple the main tube to the first bracket. The present methods of installing also include a step of engaging an engaging portion (e.g., circular channel 1428 of FIG. 14 and cap or round bulb 1534 of FIG. 15), disposed at or near a terminating end, of the telescoping rod to a securing portion (e.g., ridge 1432 and 1532 of FIGS. 14 and 15, respectively) of the second bracket to couple the telescoping rod to the second bracket. In this configuration, the connecting end is opposite to the terminating end.

According to certain preferred embodiment of the present teachings, the methods of installing further include introducing a fastener through an aperture (e.g., apertures shown in FIGS. 10A and 10B) defined in, at or near the terminating end of, the telescoping rod to prevent the telescoping rod from decoupling from the main tube.

In certain embodiments of the present teachings, a step of securing a wall portion of the first bracket to one side of sidewall is carried out prior to the step of coupling (the hook portion with the main-tube-connecting aperture) and a step of securing a supporting portion of the second bracket to an opposite side of the sidewall is carried out prior to the step of engaging (the engaging portion with the securing portion).

When the first and second brackets are being installed inside a manhole opening, method 1800 includes drilling holes into sidewalls of the manhole opening. These holes are apertures defined inside the sidewalls and are used for attaching a first bracket and/or a second bracket to the sidewall. Next, the installation process then proceeds to bolting the first bracket and/or the second bracket to the sidewall. In the event both the first bracket and the second bracket are bolted to the sidewall, it is helpful to make sure that the second bracket is bolted directly across from the first bracket to ensure that the resulting supporting subassembly will properly fit and extend across the manhole opening.

Each of the steps of obtaining the main tube and the telescoping rod may include obtaining a single extruded unitary component. In this design, the main tube and telescoping rod may be made from a plastic material. Further, the single unitary main tube component has disposed thereon the area-narrowing feature and the single unitary telescoping rod component has disposed thereon the area-expanding feature. In alternate embodiments, however, discrete components, and not such single unitary components, are used. In these embodiments, the step of obtaining the main tube may include obtaining a main tube subassembly, in which one component, the main tube, has attached thereto another discrete component, i.e., the first annular component that provides the area-narrowing feature. Preferably, the step of obtaining the main tube includes press fitting the first annular component inside the cavity of the main tube. To enable press fitting, the first annular component is fractionally smaller than the cavity of the main tube.

In other alternate embodiments, similarly, the step of obtaining the telescoping rod includes obtaining a telescoping rod subassembly, in which the telescoping rod has attached thereon a second annular component that provides the area-expanding feature. Although not necessary, the step of obtaining the telescoping rod, preferably, includes using a locking nut that couples the second annular component to the telescoping rod. In this embodiment, at least a portion of the telescoping rod is threaded and is received at one end of the locking nut. The other end of the locking nut receives that second annular component to couple the telescoping rod and the second annular component. Regardless of the different steps used, once the present supporting assembly is installed inside an opening, the present methods include installing a radar and/or a camera to the main tube.

In one embodiment of the present teachings, before the supporting subassembly is assembled, mounting clamps or other securing devices are affixed to the radar which allow the radar to be supported by the main tube. Next the radar and clamps are slid onto and tightened to the main tube. Then the remainder of the support assembly is assembled, including the pin (e.g., stainless-steel slotted spring pin). A next step includes sliding the main tube onto the arm of the first bracket through the oval aperture on the main tube while the supporting assembly is held at approximately 90 degrees to the horizontal.

Once the first bracket and the main tube are properly locked into position, the installation process, similarly on the opposite side to the first bracket, couples the telescoping rod to the second bracket. If necessary, the installation process requires making proper adjustments to ensure that the radar box is at level.

The installation process of the present teachings offers a significant advantage over the current installation processes because they offer a combination of ease of removal and easy reinstallation that are being carried out using a secure and solid, but flexible, supporting assembly. The present arrangements and methods describe herein offer benefits of easy access to and maintenance of equipment inside the radar enclosure that requires precise placement at a certain height or orientation and also allows for easy installation of objects, such as a radar and/or a camera, inside a manhole opening.

What is claimed is:

1. A supporting assembly for supporting a suspended load, said assembly comprising:
   an area-narrowing feature including a first inner surface that defines a first aperture spanning a first inner cross-sectional area;
   a main tube including an interior-main surface that extends from a first end to a second end and that defines a cavity having disposed therewithin, at said first end, said area-narrowing feature;
   an area-expanding feature including a second outer surface; and
   a telescoping rod including an outer-telescoping surface that extends from a connecting end to a terminating end and that has disposed thereon, at said connecting end, said area-expanding feature; and
   wherein, in an assembled state of said supporting assembly, said outer-telescoping surface slidably passes through and establishes a first frictional contact with said first inner surface of said area-narrowing feature, such that said second outer surface slidably engages and establishes a second frictional contact with said interior-main surface, and said area-narrowing feature and said area-expanding feature facilitate slidable engagement of said telescoping rod to expand out of or retract inside, without decoupling from, said main tube.

2. The supporting assembly for supporting said suspended load of claim 1, wherein when a substantial portion of said outer-telescoping surface slidably passes through said first inner surface, said area-narrowing feature abuts said area-expanding feature preventing decoupling of said telescoping rod from said main tube.

3. The supporting assembly for supporting said suspended load of claim 1, wherein, in said assembled state of said supporting assembly, displacement of said telescoping rod is confined in an x-direction and displaces, in at least one of a y-direction or a z-direction, less than about 3° from at least one of an x-z plane or an x-y plane, respectively, wherein said x-z plane is a plane that extends in said x-direction and said z-direction and said x-y plane extends in said x-direction and said y-direction.

4. The supporting assembly for supporting said suspended load of claim 1, wherein said telescoping rod includes at least one of said area-expanding feature as a single unitary structure or the main tube includes said area-narrowing feature as a single unitary structure.

5. The supporting assembly for supporting said suspended load of claim 1, wherein said area-narrowing feature is a first annular component and said area-expanding feature is a second annular component.

6. The supporting assembly for supporting said suspended load of claim 5, wherein each of said cavity, said outer-telescoping surface and said first aperture is circular shaped, said area-narrowing feature is a diameter-narrowing feature, said area-expanding feature is a diameter-expanding feature, and said first aperture spans a first inner diameter, wherein said second annular component includes said second outer surface spanning a second outer diameter and a second inner surface defining a second aperture that spans a second inner diameter, wherein said telescoping rod further comprises a relatively-larger-outer-diameter rod portion extending into said terminating end and a relatively-smaller-outer-diameter rod portion extending into said connecting end, wherein a diameter of said relatively-smaller-outer-diameter rod portion is smaller than said second inner diameter, such that in said assembled state of said supporting assembly, said second inner surface, at or near said connecting end, contacts outer surface of said relatively-smaller-outer-diameter rod portion as said telescoping rod is fixedly secured inside said second annular component to form a telescoping rod subassembly having an effective diameter that is equal to said second outer diameter.

7. The supporting assembly for supporting said suspended load of claim 6, wherein, in an assembled state of said supporting assembly, said main tube and said telescoping rod combine to a span a distance ranging from about 2 feet to about 4 feet, and said first inner diameter is about 19 mm, first outer diameter is about 24.999 mm, second inner diameter is about 12 mm, second outer diameter is about 24.85 mm, said diameter of said relatively smaller-outer-diameter rod portion is about 11.99 mm, said diameter of said relatively larger-outer-diameter rod portion is about 18.8 mm, and a diameter of said interior-main surface is about 25 mm.

8. The supporting assembly for supporting said suspended load of claim 1, wherein said main tube, at or near a second end, has defined therein a main-tube-connecting aperture, and wherein said supporting assembly further comprises a first bracket including a hook portion and a wall portion, wherein in an installed state of said supporting assembly, said hook portion engages with said main-tube-connecting aperture to couple said main tube and said first bracket, and said wall portion has defined therein one or more apertures designed to attach said first bracket to one end of a sidewall of an opening defined within a surface.

9. The supporting assembly for supporting said suspended load of claim 8, wherein said telescoping rod, at or near a terminating end, includes an engaging portion, and wherein said supporting assembly further comprises a second bracket including a securing portion and a supporting portion, wherein in an installed state of said supporting assembly, said engaging portion engages with said securing portion to couple said telescoping rod to said second bracket and said supporting portion has defined therein one or more apertures designed to attach said second bracket to an opposite side of said sidewall of said opening defined within said surface.

10. The supporting assembly for supporting said suspended load of claim 9, wherein said securing portion includes a ridge that secures an engaging portion, which includes any one member chosen from a group comprising circular slot, spherical bulb and hourglass.

11. The supporting assembly for supporting said suspended load of claim 10, wherein said circular slot being linearly disposed on said telescoping rod and having defined therein a channel-shaped opening that engages with said ridge to couple said telescoping rod and said second bracket.

12. The supporting assembly for supporting a said suspended load of claim 10, wherein said spherical bulb having a diameter larger than a ridge dimension of said ridge, and having a pinched region proximate to said spherical bulb such that in a coupled position of said telescoping rod with said second bracket, said pinched region of said telescoping rod engages with said ridge of said second bracket and said spherical bulb abuts said ridge, preventing decoupling of said telescoping rod with said second bracket.

13. The supporting assembly for supporting said suspended load of claim 10, wherein, in said installed state of said supporting assembly, said second bracket has disposed thereon a locking mechanism to hold in place said engaging portion as it engages with said securing portion and to prevent said telescoping rod from decoupling from said second bracket.

14. The supporting assembly for supporting said suspended load of claim 10, wherein said telescoping rod, at or near said terminating end has defined therein a telescoping-rod-connecting aperture, and wherein in an installed state of said supporting assembly, a fastening member engages with said telescoping-rod-connecting aperture to prevent decoupling of said telescoping rod from said main tube.

* * * * *